United States Patent
Lee et al.

(10) Patent No.: US 11,304,145 B2
(45) Date of Patent: Apr. 12, 2022

(54) METHOD AND DEVICE FOR CONTROLLING STATE OF TERMINAL IN MOBILE COMMUNICATION SYSTEM

(71) Applicant: Samsung Electronics Co., Ltd., Suwon-si (KR)

(72) Inventors: Daewoo Lee, Seoul (KR); Youngky Kim, Seoul (KR); Seungjoo Maeng, Seongnam-si (KR); Kiho Cho, Seongnam-si (KR); Seho Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/314,984

(22) PCT Filed: Jul. 17, 2017

(86) PCT No.: PCT/KR2017/007672
§ 371 (c)(1),
(2) Date: Jan. 3, 2019

(87) PCT Pub. No.: WO2018/012949
PCT Pub. Date: Jan. 18, 2018

(65) Prior Publication Data
US 2019/0313340 A1    Oct. 10, 2019

(30) Foreign Application Priority Data

Jul. 15, 2016  (KR) .................. 10-2016-0090068
Nov. 18, 2016  (KR) .................. 10-2016-0154390

(51) Int. Cl.
*H04W 52/02* (2009.01)
*H04W 48/16* (2009.01)
(Continued)

(52) U.S. Cl.
CPC ......... *H04W 52/0277* (2013.01); *H04W 8/22* (2013.01); *H04W 48/16* (2013.01);
(Continued)

(58) Field of Classification Search
CPC ..... H04W 48/12; H04W 48/16; H04W 48/18; H04W 52/02; H04W 52/0209;
(Continued)

(56) References Cited

U.S. PATENT DOCUMENTS 9,807,819 B1 * 10/2017 Zhu ..................... H04W 92/02
2006/0223465 A1 * 10/2006 Akiba ............... H04W 52/0277
455/127.4

(Continued)

FOREIGN PATENT DOCUMENTS

EP    1 679 917 A2    7/2006
EP    1 708 369 A1    10/2006
(Continued)

OTHER PUBLICATIONS

International Search Report in PCT/KR2017/007672 dated Oct. 23, 2017.
(Continued)

*Primary Examiner* — Awet Haile
(74) *Attorney, Agent, or Firm* — Jefferson IP Law, LLP

(57) ABSTRACT

The present disclosure relates to a communication technique for convergence of a 5G communication system for supporting a higher data transmission rate beyond a 4G system with an IoT technology, and a system therefor. The present disclosure can be applied to an intelligent service (for example, a smart home, a smart building, a smart city, a smart car or connected car, health care, digital education, retail business, security and safety-related service, etc.) on the basis of a 5G communication technology and an IoT-related technology. A communication method of a terminal
(Continued)

in a mobile communication system according to an embodiment of the present specification comprises the steps of: acquiring cell-related information corresponding to a first communication mode; acquiring cell-related information corresponding to a second communication mode; receiving a first message through the second communication mode; and transmitting a request message corresponding to the first communication mode on the basis of the first message.

16 Claims, 18 Drawing Sheets

(51) Int. Cl.
*H04W 64/00* (2009.01)
*H04W 56/00* (2009.01)
*H04W 48/18* (2009.01)
*H04W 8/22* (2009.01)
*H04W 48/12* (2009.01)
*H04W 88/06* (2009.01)

(52) U.S. Cl.
CPC ........... *H04W 48/18* (2013.01); *H04W 52/02* (2013.01); *H04W 56/0015* (2013.01); *H04W 64/00* (2013.01); *H04W 48/12* (2013.01); *H04W 52/0209* (2013.01); *H04W 88/06* (2013.01); *Y02D 30/70* (2020.08)

(58) Field of Classification Search
CPC ......... H04W 52/0277; H04W 56/0015; H04W 64/00; H04W 88/06; H04W 8/22; Y02D 70/12; Y02D 70/126
See application file for complete search history.

(56) References Cited

U.S. PATENT DOCUMENTS

| | | |
|---|---|---|
| 2008/0247344 A1 | 10/2008 | Bahl et al. |
| 2011/0195743 A1* | 8/2011 | Jee ......................... H04W 48/18 455/522 |
| 2011/0319072 A1* | 12/2011 | Ekici ..................... H04W 48/18 455/426.1 |
| 2013/0266000 A1 | 10/2013 | Tarradell |
| 2013/0324122 A1 | 12/2013 | Lee et al. |
| 2013/0329554 A1* | 12/2013 | Centoza ................ H04W 28/08 370/230.1 |
| 2014/0016492 A1 | 1/2014 | Jung et al. |
| 2015/0071469 A1 | 3/2015 | Solum et al. |
| 2015/0092738 A1 | 4/2015 | Chakraborty et al. |
| 2015/0131502 A1* | 5/2015 | Narasimha ............ H04W 68/12 370/311 |
| 2016/0081019 A1 | 3/2016 | Pujari et al. |
| 2016/0088550 A1 | 3/2016 | Rabii et al. |
| 2016/0183166 A1* | 6/2016 | Chen ....................... H04W 4/90 455/435.1 |
| 2016/0337969 A1 | 11/2016 | Park et al. |
| 2017/0086166 A1 | 3/2017 | Kasilya Sudarsan et al. |
| 2017/0195959 A1 | 7/2017 | Park et al. |

FOREIGN PATENT DOCUMENTS

| | | |
|---|---|---|
| EP | 2 395 811 A2 | 12/2011 |
| KR | 10-2016-0065153 A | 6/2017 |
| WO | 2015-105389 A1 | 7/2015 |
| WO | 2015-170831 A1 | 11/2015 |

OTHER PUBLICATIONS

European Search Report dated Jun. 3, 2019, issued in European Patent Application No. 17828019.4.

* cited by examiner

METHOD AND DEVICE FOR CONTROLLING STATE OF TERMINAL IN MOBILE COMMUNICATION SYSTEM

TECHNICAL FIELD

Embodiments of the present invention relate to a state control method and device of a terminal in a mobile communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In such various communication environments, there is a need of a method and device for controlling a state of a terminal to reduce power consumption and provide services efficiently.

DISCLOSURE OF INVENTION

Technical Problem

The present invention has been conceived to solve the above problems and aims to provide a method and apparatus for controlling a state of a terminal to provide services smoothly. The preset invention also aims to provide a method and device for controlling a terminal that is capable of managing power consumption efficiently in such a way of performing communication with a network in multiple communication modes and accessing the network in a different manner depending on the situation.

Solution to Problem

In accordance with an aspect of the present invention, a communication method of a terminal in a mobile communication system includes acquiring information on a cell corresponding to a first communication mode, acquiring information on a cell corresponding to a second communication mode, receiving a first message via the second communication mode, and transmitting a request message corresponding to the first communication mode based on the first message.

In accordance with another aspect of the present invention, a terminal of a mobile communication system includes a transceiver configured to transmit and receive signals and a controller connected to the transceiver and configured to control to acquire information on a cell corresponding to a first communication mode, acquire information on a cell corresponding to a second communication mode, receive a first message via the second communication mode, and transmit a request message corresponding to the first communication mode based on the first message.

Advantageous Effects of Invention

The present invention is advantageous in terms of improving user's convenience by making it possible for a terminal to transmit/receive signals smoothly and perform data communication at a low power level in a predetermined situation. The present invention is also advantageous in terms of improving a standby power reduction effect in such a way of allowing a terminal to operate in two modes and establish a performance-centric communication mode upon receipt of a paging message in a communication for low power management and of facilitating receipt of information in such a way of adaptively activating the low power management in a situation where the terminal is missing.

MODE FOR THE INVENTION

Figure 1:
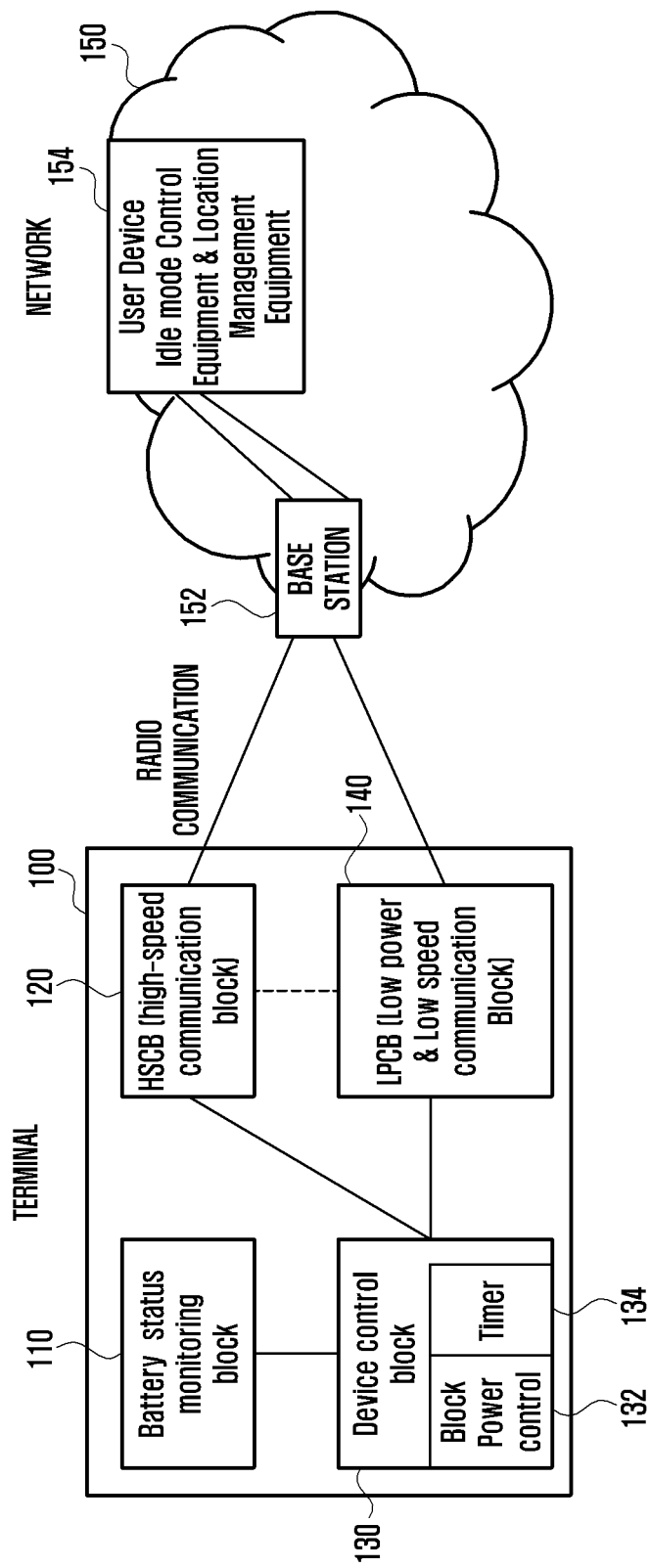
FIG. 1 is a diagram illustrating configurations of a terminal and a network according to an embodiment of the present invention.

Exemplary embodiments of the present invention are described in detail with reference to the accompanying drawings.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

In an embodiment, the terms "minimum power communication mode" and "low power low specification communication mode" are interchangeably used to intend a communication mode in which the terminal dissipates low power. Such a communication mode may be designed for a terminal to perform an operation as opposed to that of the communication mode in which an MTC or IoT terminal accesses the network.

In an embodiment, the terms "mobile communication mode" and "high specification communication mode" may denote a communication mode designed for data communication at a data rate relatively higher than that in the low specification communication mode and may include a communication mode guaranteeing high performance, low latency, and high reliability. In more detail, it may include communication modes related to LTE, LTE-A, and 5G communications.

However, the communication modes are not limited to the aforementioned ones, and it is obvious that the present invention is applicable to all possible cases where a terminal switch from one operation mode, upon receipt of a message from the network therein, to another operation mode according to the situation. In an embodiment, the aforementioned communication modes may be referred to as a first communication mode and a second communication mode.

The radio communication technologies have been evolved in the order of 2G, 3G, 4G, and 5G. As the communication technology changes from one generation to the next, the data rate increases while the response latency is reduced. However, the increased data rate and reduced response latency entail an increase of power consumption of the terminal. The present invention proposes a method for increasing a battery run time by minimizing the power consumption of the terminal in the standby mode using a low-power communication technology.

The low-power communication technology makes it possible to secure broader coverage in comparison with a normal mobile communication technology. The present invention proposes a short data communication provision method for use in an out-of-coverage situation based on a low-power communication technology in a mobile communication system.

The low-power communication technology supports an ultra-low power consumption mode unlike the normal mobile communication technology. The present invention proposes a terminal location tracking method for facilitating the terminal owner to track the terminal by allowing the terminal to register itself with the network even when the terminal is stolen/lost and powered off.

In an embodiment, the terminal may be a mobile electronic device equipped with a portable communication device. Examples of the terminal may include a portable phone, a wearable device, a vehicle, and a notebook computer.

FIG. 1 is a diagram illustrating configurations of a terminal and a network according to an embodiment of the present invention.

In reference to FIG. 1, the terminal (or user equipment (UE)) 100 may transmit and receive signals to and from the radio network 150 according to an embodiment of the present invention.

According to an embodiment, the terminal 100 may include at least one of a battery status monitor 110, a high-speed communication block (HSCB) 120, a controller 130, and a low power and low speed communication block (LPCB) 140. The controller 130 may include at least one of a block power control unit 132 and a timer 134.

In an embodiment, the HSCB 120 is a device for performing a high-speed communication, and the LPCB 140 may perform communication at a power lower than that of the HSCB 120. The HSCB 120 and the LPCB 140 may share some modules of a processor and perform respective operations under the control of the controller 130. The communication blocks and controller may be implemented via a plurality of processors.

The battery status monitor 110 may monitor the battery status of the terminal. In the case of a mobile terminal, the battery status monitor 110 may monitor the battery for indicating a low residual battery power or a necessity of a long communication. The battery status monitor 110 may also determine the type of application in use and the battery status according to the user settings.

The controller 130 may control overall operations of the terminal (in particular, the block power control unit 132 may control the power required for communication) and determine a communication scheme per operation mode via the timer 134.

The terminal 100 may connect to the radio network 150, which may include a base station 152 and a user device idle mode control and location management equipment 154. In an embodiment, the user device idle mode control and location management equipment 154 may be part of the base station 152 or a separate network node. According to an embodiment, the user device idle mode control and location management equipment 154 may also be responsible for mobility management. In an embodiment, the user device idle mode control and location management equipment 154 may be a mobility management entity (MME). In an embodiment, network access via HSC and LPC may be performed via the same user device idle mode control and location management device 154, or via dedicated user device idle mode control and location management equipments, respectively. By way of example of an LTE system, the HCS may connect to a normal MME, and the LPC may connect to the network via an LPC-dedicated MME.

In an embodiment, the terminal 100 may perform radio communication with the base station 152 to connect to the network 150.

Figure 2:
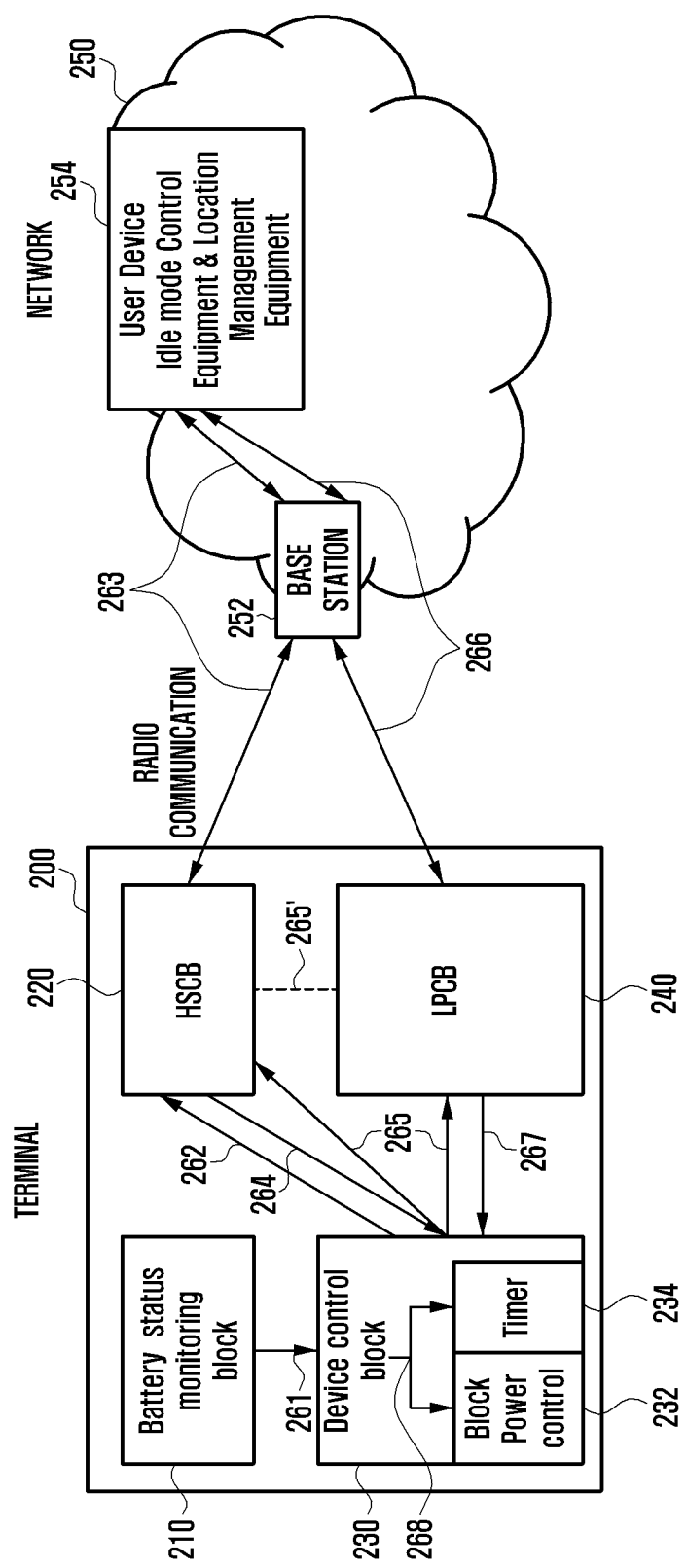
FIG. 2 is a diagram illustrating a mode determination and switching method of a terminal and a method for signal exchange between the terminal and a base station according to an embodiment of the present invention.

FIG. 2 is a diagram illustrating a mode determination and switching method of a terminal and a method for signal exchange between the terminal and a base station according to an embodiment of the present invention.

In the embodiment of FIG. 2, the terminal 200 may include at least one of a battery status monitor 210, an HSCB 220, a controller 230, and an LPCB 240. The controller 230 may include at least one of a block power control unit 232 and a timer 234.

The terminal 200 may connect to a radio network 250, which may include a base station 252 and a user device idle mode control and location management equipment 254.

At step 261, the battery status monitor 210 may monitor the battery status of the terminal. If the residual battery power of the terminal 200 is equal to or less than a predetermined level, the battery status monitor 210 may send the controller 230 information indicative of entrance into a minimum power communication mode. If a condition preset by the user is satisfied, the battery status monitor 210 may send the controller 230 information indicative of minimum power communication mode entrance. In an embodiment, the battery status for entering the minimum power communication mode may be determined by at least one of the network and user settings.

At step 262, if it is determined to enter the minimum power communication mode, the controller 230 may send a signal to the HSCB 220 for communication path switching. In detail, the controller may send the HSCB 220 a signal indicating a communication path switching to the LPCB 240.

At step 263, the HSCB 220 may send the core network 250 information on the switched communication path. In detail, the HSCB 220 may send the core network the information indicating that the communication path is switched to the LPCB 240 according to the entrance into the minimum power communication mode. The core network node 254 that receives the information may be the base station 250 or the user device idle mode control and location management equipment 254. The HSCB 220 may receive a path switching-related response from the core network.

At step 264, the HSCB 220 may send the controller 230 the information on the communication path switching. In detail, the HSCB 220 may send the controller 230 the information indicating that the communication path switching has been completed.

At step 265, the controller 230 may send the controller 230 information indicating that the minimum power communication mode is enabled for at least one of the HSCB 220 and the LPCB 240. This information may be selectively transmitted to at least one of the HSCB 220 and the LPCB 240. In the case where the information is selectively transmitted, at least one of the HSCB 220 and the LPCB 240 may relay the information to at least one other node. In an embodiment, the minimum power communication mode may include performing a low-power low-speed communication in an idle state. In detail, the terminal 200 in the idle state may reduce the standby power consumption by switching from the HSC to the LPC.

At step 266, the LPCB 240 may exchange information on the service start associated with the minimum power communication mode with the core network 250. Here, it may be possible to perform an additional procedure for the connection or use part of the information related to the communication that was previously performed by the HSCB 220. In detail, it may be possible to perform an attach procedure to the network for performing an LPC based on the terminal context information used for the HSC.

At step 267, the LPCB 230 may send the controller 230 information indicating that a registration for starting a service is completed with the core network 250. In detail, the LPCB 220 may send the controller the information indicating that the LPCB 220 has been provided for a service.

At step 268, the controller 230 may perform an operation related to the minimum power communication mode via the block power control unit 232 and the timer 234. In the minimum power communication mode, it may be possible to stop or minimize power supply to the operation blocks with the exception of the least number of operation blocks required for communication. In an embodiment, the operations of the controller may include allocating power preferentially to the operation blocks associated with the LPCB 240. In detail, the operation related to the minimum power communication mode may include at least one of monitoring for LPC-related messages and transmitting information related to the terminal 200 to the network 250 through LPC.

In an embodiment, the LPC and HSC may be simultaneously performed. In detail, information related to data communication may be transmitted via HSC while control information such as location report information may be transmitted via LPC. For example, in the case of performing a HSC, it may be possible to transmit status information such as terminal location information via LPC.

In an embodiment, operations of some of the steps may be omitted depending on the scenario, e.g., the operations of steps 262 to 264 may be omitted or performed selectively.

Figure 3:
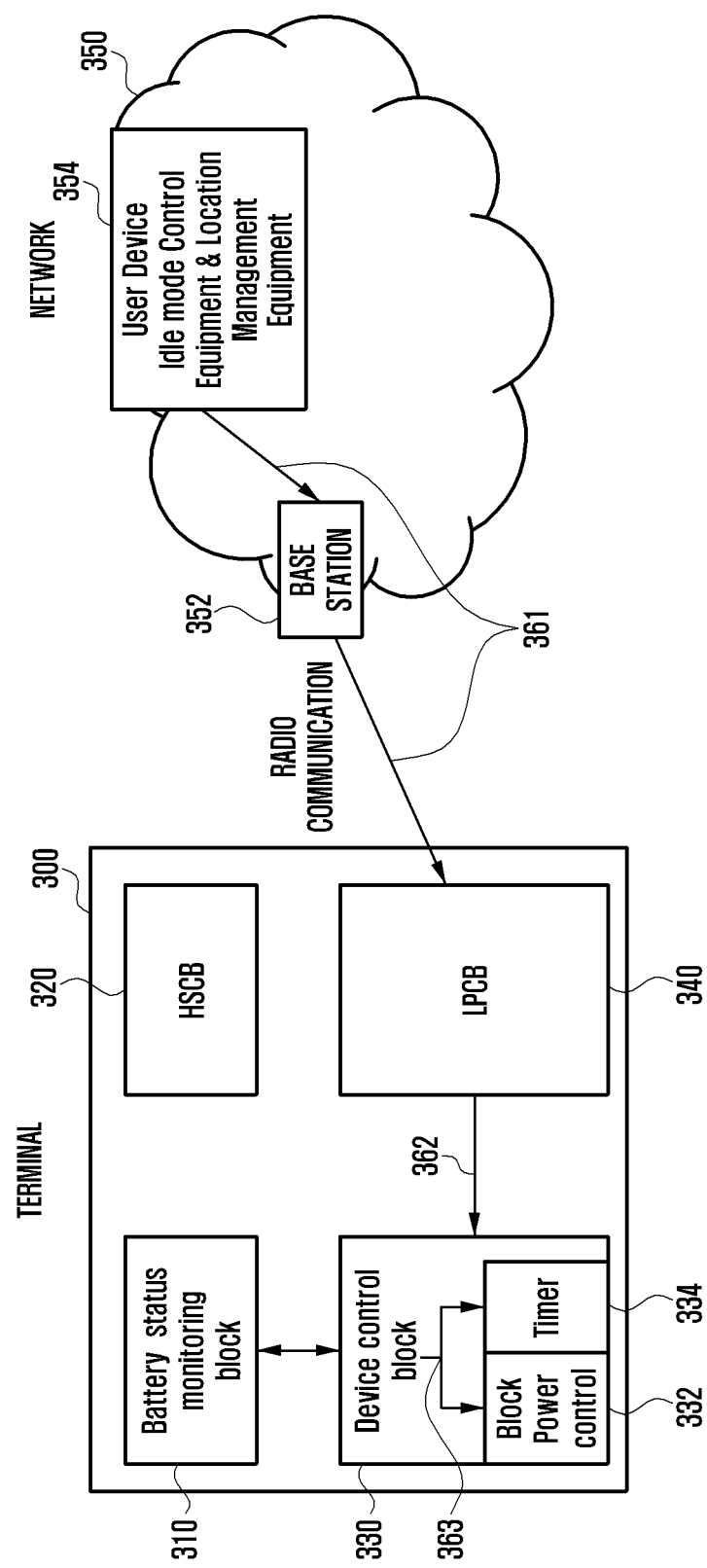
FIG. 3 is a diagram illustrating a method for exchanging signals between a terminal in a predetermined mode with a base station according to an embodiment of the present invention.

FIG. 3 is a diagram illustrating a method for exchanging signals between a terminal in a predetermined mode with a base station according to an embodiment of the present invention.

In the embodiment of FIG. 3, the terminal 300 may include at least one of a battery status monitor 310, a HSCB 320, a controller 330, and an LPCB 340. The controller 330 may include at least one of a block power control unit 332 and a timer 334.

The terminal may connect to the radio network 350, which may include a base station 352 and a user device idle mode control and location management equipment 354. In an embodiment, the terminal 300 may operate in a low power low specification communication mode. The radio network may recognize that the terminal 300 is operating in the low power low specification communication mode.

At step 361, the terminal may receive information related to downlink data from the radio network. In detail, the LPCB 340 may receive information related to the downlink data from the radio network.

At step 362, the LPCB 340 may send the controller 330 information indicating that the information related to the downlink data is received. In detail, the LPCB 340 may send the controller 330 an indicator indicating receipt of the downlink data.

At step 363, the controller 330 may supply power to the blocks required for processing data to process the downlink data. In detail, the controller 330 may control the block power control unit 332 to supply power to the blocks required for processing the downlink data received via the LPCB 340 to receive and process the data.

In an embodiment, the downlink data transmission operation in the LPC mode may be used for transmitting configuration information for terminal status monitoring or resources allocation via higher layer signaling. In detail, the network 350 may transmit downlink signals to the terminal 300 in the LPC mode that is used for transmitting a signal carrying no user data or a signal carrying data smaller than a predetermined size. As described in the above embodiment, the terminal 300 may perform power control based on the received signal to perform a downlink data reception operation.

Figure 4:
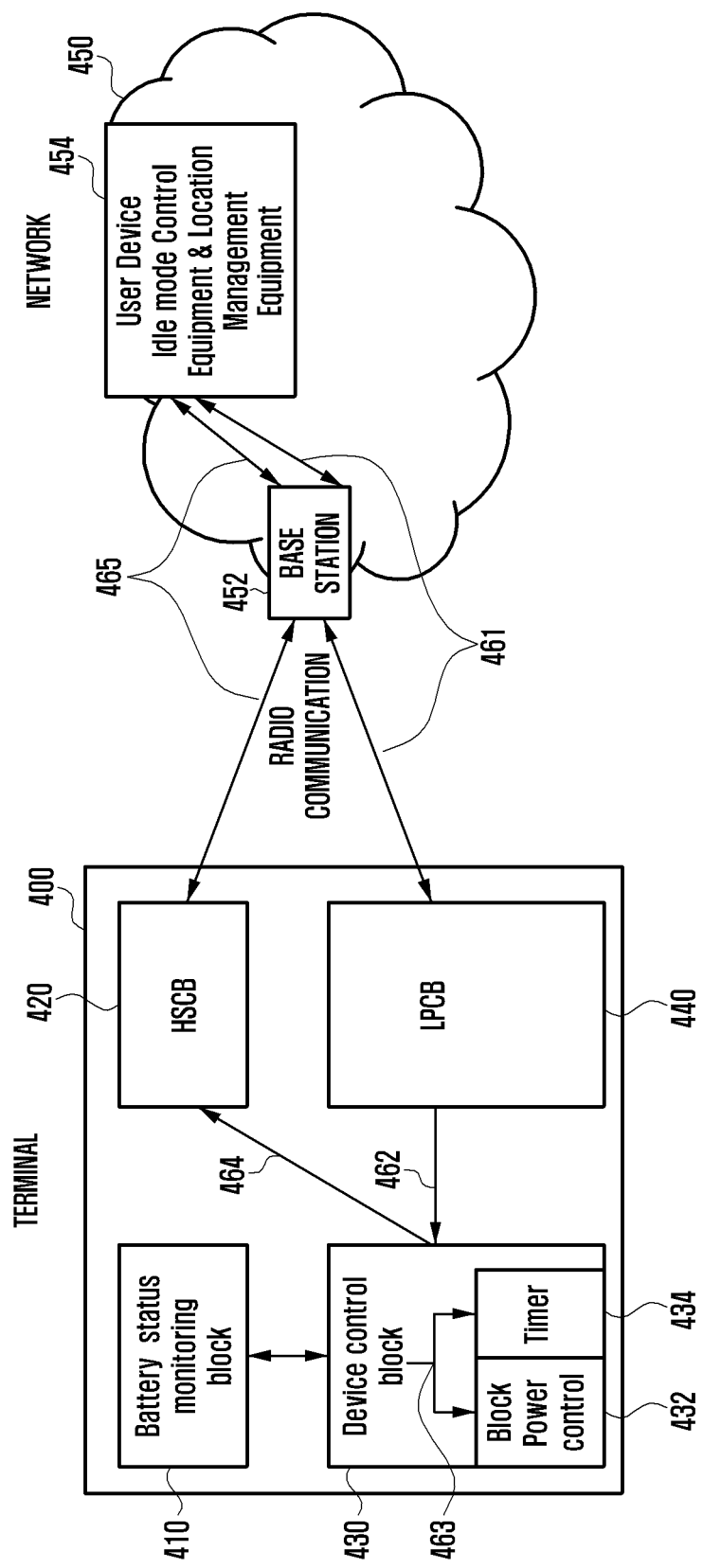
FIG. 4 is a diagram illustrating a method for exchanging signals between a terminal in a predetermined mode and a base station according to another embodiment of the present invention.

FIG. 4 is a diagram illustrating a method for exchanging signals between a terminal in a predetermined mode and a base station according to another embodiment of the present invention.

In the embodiment of FIG. 4, the terminal 400 may include at least one of a battery status monitor 410, an HSCB 420, and an LPCB 440. The controller 430 may include at least one of a block power control unit 432 and a timer 434.

The terminal 400 may connect to the radio network 450, which may include a user device idle mode control and location management equipment 454. In an embodiment, the terminal 400 may operate in a low power low specification communication mode. The radio network 450 may recognize that the terminal is operating in the low power low specification communication mode.

At step 461, the terminal 400 may receive information on downlink data from the radio network 450. In detail, the LPCB 440 may receive the information on the downlink data from the radio network. In an embodiment, the information on the downlink data may include a paging signal. In detail, the paging signal may include information indicating that HSC mode-based data transmission is required and, upon receipt of this information, the terminal 400 may connect to the network 450 in the HSC mode based on the received information. The information on the downlink data may include information for use in connecting to the network 450 in the HSC mode and make it possible to facilitate connection to the network afterward in the HSC mode.

At step 462, the LPCB 440 may send the controller 430 the information indicating that the information on the downlink data is received. In detail, the LPCB 440 may send the controller 430 the information that the downlink data is received.

At step 463, the controller 430 may supply power to the blocks required for processing data and process the downlink data. In detail, the controller 430 may supply power to the blocks necessary for processing the received downlink data and perform the operation of receiving and processing the data.

The controller 430 may also determine whether it is necessary to connect to the mobile communication network via the HSCB 420 for processing the downlink data received via the LPCB 440. In detail, the controller 430 may determine whether a high speed data communication is required for receiving the downlink data. Such a determination may be made based on the message received at step 461 and, if the paging message includes the information requesting for connection to the network 450 via the HSC mode, the controller 430 may determine the necessity to connect to the mobile communication network via the HSCB 420. According to an embodiment, if it is determined that connecting to the network in the LPC mode based on the information received at step 461 is advantageous in comparison with connection to the network in the HSC mode, the controller 430 may determine that it is necessary to connect to the mobile communication network via the HSCB 420.

It is it determined that it is necessary to connect to the mobile communication network via the HSCB 420, the controller 430 may send the HSCB 420 a signal, at step 464, for activating the HSCB 420.

At step 465, the HSCB 420 may be activate for communicating signals with the radio network 450 under the control of the controller 430. In detail, the HSCB 420 may make a connection to the radio network 450 for receiving information on the downlink data. In an embodiment, it may be possible to transmit to the network 450 at least one message to connect to the network 450, and the at least one message may include an Attach request message. It may also be possible to transmit a message for connecting to the network 450 based on the information received at step 461.

In order for the terminal 400, which is communicating signals with the network 450 in the LPC mode, to operate in the HSC mode, the network may send a message in the LPC mode such that the terminal establishes a connection to the network in the HSC mode based on the message.

Figure 5:
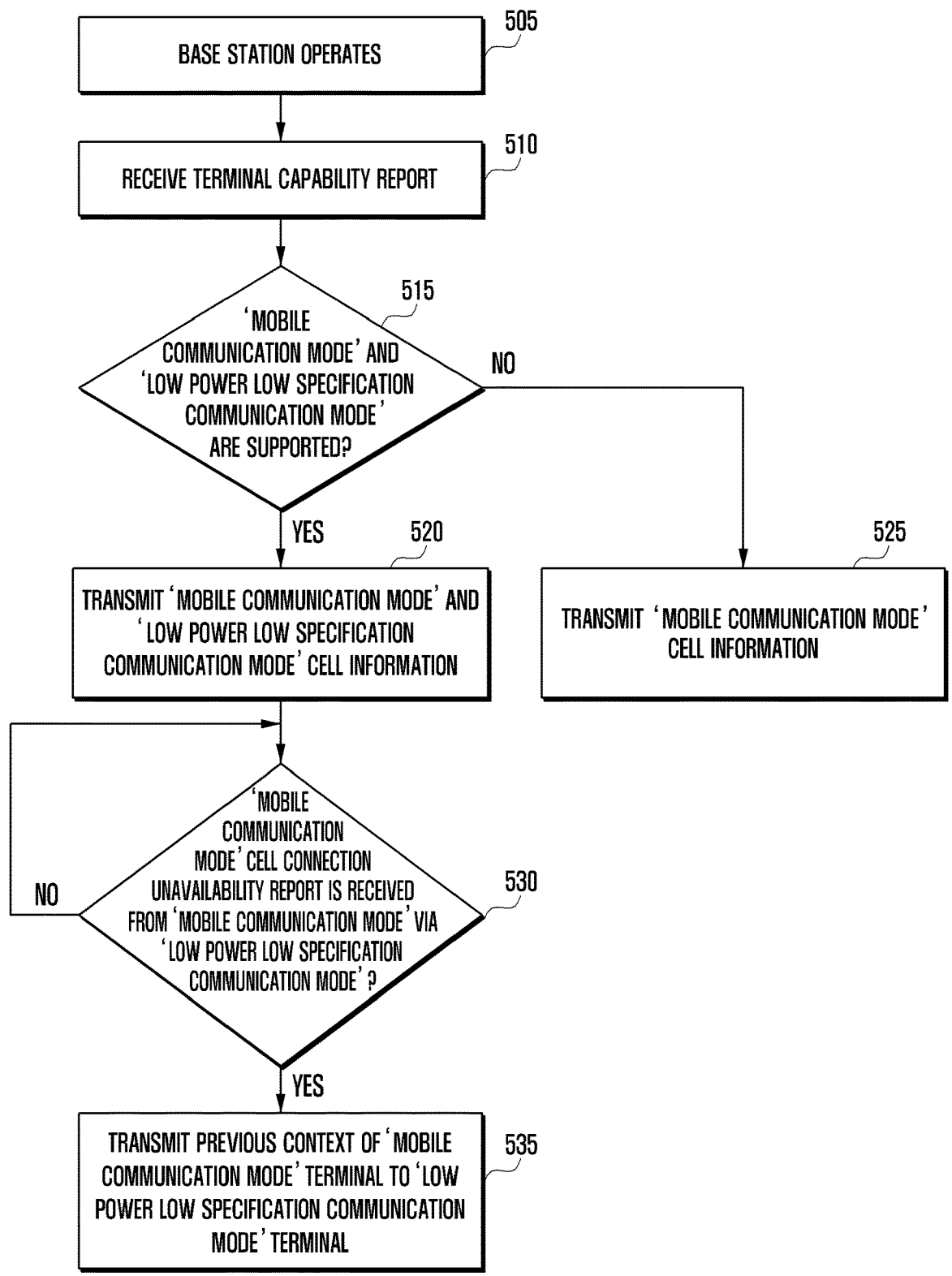
FIG. 5 is a flowchart illustrating an operation of a base station according to an embodiment of the present invention.

FIG. 5 is a flowchart illustrating an operation of a base station according to an embodiment of the present invention.

In reference to FIG. 5, the base station may perform an operation as follows to communicate signals with a terminal that simultaneously supports a mobile communication mode and a low power low specification communication mode. In an embodiment, the terminal may support the mobile communication mode via an HSCB and the low power low specification communication mode via an LPCB. In an embodiment, the mobile communication mode may be interchangeably referred to as HSC mode, and the low power low specification communication mode may be referred to as LPC mode.

At step 505, the base station performs an operation for communicating signals with the terminal.

At step 510, the base station may receive terminal capability information. The terminal capability information may be transmitted to the base station in the terminal's attach procedure. The terminal capability information may include the information indicating at least one of the HSC and LPC modes that the terminal supports.

At step 515, the base station may determine whether the terminal supports at least one of the HSC and LPC modes based on the received capability information.

If it is determined that the terminal supports the two modes simultaneously, the base station may transmit to the terminal the mobile communication mode-related cell information and the low power low specification communication-mode related cell information; if not, the base station may transmit to the terminal only the mobile communication-related cell information at step 525. In an embodiment, the cell information may be transmitted to the terminal via dedicated signaling or broadcast signaling. The cell information may also be transmitted to the terminal in a system information message. The terminal may attach to each cell based on the cell information.

Afterward, the base station may communicate signals with the terminal and, at step 530, it may receive a mobile communication mode-based cell attach-unavailable report from the terminal in the low power low communication mode. In detail, if a predetermined condition is satisfied, the terminal may determine to transmit the corresponding information in the low power low specification communication mode and, in this case, the terminal may transmit the corresponding information to the base station in the low power low specification communication mode. In an embodiment, if the communication condition in the HSC mode is poor, the terminal may notify the base station of the HSC mode-based attach unavailableness via the LPC mode. In an embodiment, if the terminal in the idle mode determines to attach to the base station via the LPC mode, it may transmit such information to the base station via the LPC mode. The information being transmitted as above may include terminal identity information used by the terminal for attach to the network in the HSC mode, and one of the network nodes may use terminal context information used in the previous HSC mode communication for switching to the LPC mode based on the identity information.

If no unavailableness report is received, the terminal may continue communication with the base station via the HSC mode.

At step 535, the base station may transmit the context information of the terminal connected to the cell in the mobile communication mode to the terminal in the low power low specification communication mode. In detail, it may be possible to transmit all or part of the terminal context information used for the signal communication in the mobile communication mode to the terminal in the low power low specification communication mode, and the terminal may communicate signals with the base station using the received information. In an embodiment, the base station may transmit information changed by the network node as part of the information used in the HSC and LPC modes to the terminal. In detail, if the terminal identity information used in the HSC mode is changed in the LPC mode, the information on the change may be transmitted to the terminal. In an embodiment, it may be possible to transmit system information for performing the HSC based on the system information transmission method for the LPC mode. In detail, if the terminal cannot attach to the HSC-related cell but can attach to the LPC-related cell, the LPC cell may transmit to the terminal the information for use in HSC attach via the system information and, at this time, the HSC attach-related information may be conveyed in the system information of the LPC cell via a broadcast-based system information delivery method or a dedicated signal transmission-based system information delivery method. In this way, the terminal may access the cell without acquisition of separate system information in the HSC mode.

Figure 6:
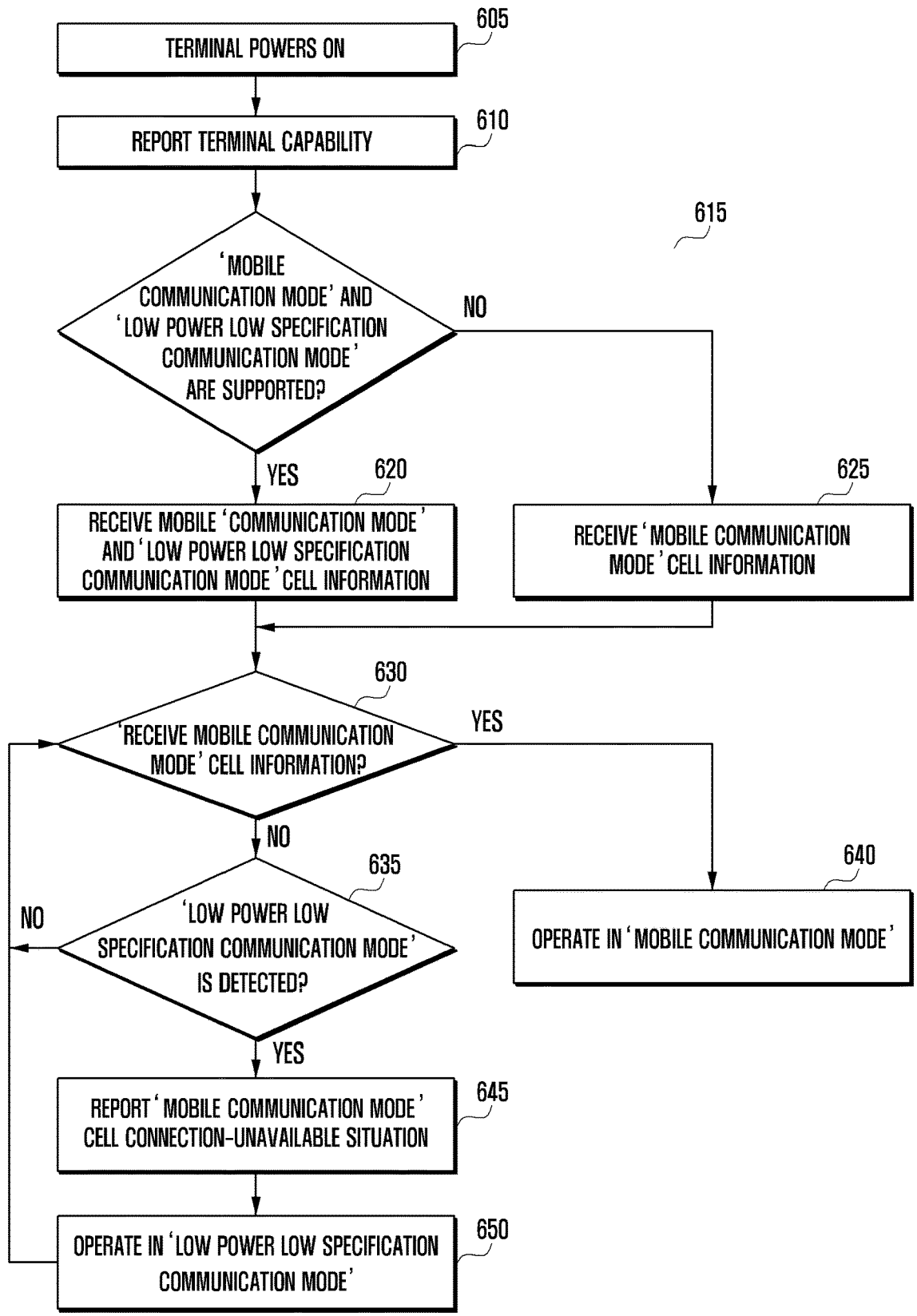
FIG. 6 is a flowchart illustrating an operation of a terminal according to an embodiment of the present invention.

FIG. 6 is a flowchart illustrating an operation of a terminal according to an embodiment of the present invention.

In reference to FIG. 6, the terminal may communicate signals with a base station in at least one of a mobile communication mode and a low power low specification communication mode.

At step 605, the terminal may power on to start its operation. It is obvious that the following operation is performed when the terminal attempts to attach to the base station as well as when the terminal powers on. In detail, when the terminal powers on, it may operate in a predetermined mode to communicate signals with the base station using some of its modules. In an embodiment, the mobile communication mode may be interchangeably referred to as HSC mode, and the low power low specification communication mode may be interchangeably referred to as LPC mode.

At step 610, the terminal may transmit to the base station a communication mode-related capability report. In detail, the terminal may transmit to the base station the information on at least one of the mobile communication mode and the low power low specification communication mode that it supports. The terminal capability information may include information indicating at least one of the HSC and LPC modes that the terminal supports.

At step 615, the terminal may determine whether it supports at least one of the HSC and LPC modes based on the received capability information. No description is made of the case where both the two modes are not supported. In the case of supporting both the two modes, the terminal may receive the cell information related to the mobile communication mode and the low power low specification communication mode at step 620. In the case of supporting only the mobile communication mode, the terminal may receive the cell information related to the mobile communication mode from the base station at step 625.

At step 630, the terminal may determine whether a cell related to the mobile communication mode is detected. The cell detection determination may be made according to terminal location and terminal condition, and the terminal may not perform mobile communication mode-related cell search autonomously. If the terminal is out the coverage of the mobile communication mode-related call, it may fail to detect the corresponding cell. Detecting a cell may include receiving at least one signal from the base station.

If a mobile communication mode-related cell is detected, the terminal may operate in the mobile communication mode at step 640.

If no mobile communication mode-related cell is detected, the terminal may determine to perform a low power low specification communication mode-related cell search at step 635 and, if no low power low specification communication mode-related cell is detected, it may determine whether to perform the mobile communication mode cell search.

If a low power low specification communication mode-related cell is detected, the terminal may transmit, at step 645, information reporting unavailability of attaching to the mobile communication mode-related call to at least one of the base station or a network node through the low power low specification communication-related cell. In an embodiment, if the HSC mode-related communication condition is poor, the terminal may transmit information reporting unavailability of HSC mode-based attachment to the base station via the LPC mode. In an embodiment, if the terminal in the idle mode determines to attach to the base station via the LPC mode, it may transmit the corresponding information to the base station via the LPC mode. The information being transmitted may include terminal identity information used by the terminal for attachment to the network in the HSC mode, and one of network nodes may use the terminal context information used previously in the HSC mode for switching to the LPC mode based on the identity information. In an embodiment, if it is impossible to perform cell attachment, this may include a case where the terminal is configured so as not to perform attachment in the HSC mode.

At step 650, the terminal may operate in the low power low specification communication mode. The terminal may perform a mobile communication mode-related cell search periodically or aperiodically in the course of operating in the low power low specification communication mode. In an embodiment, the terminal operating in the LPC mode may receive a message from the base station instructing to perform an HSC mode-based attachment and perform, upon receipt of the message, the HSC mode-based attachment.

Figure 7:
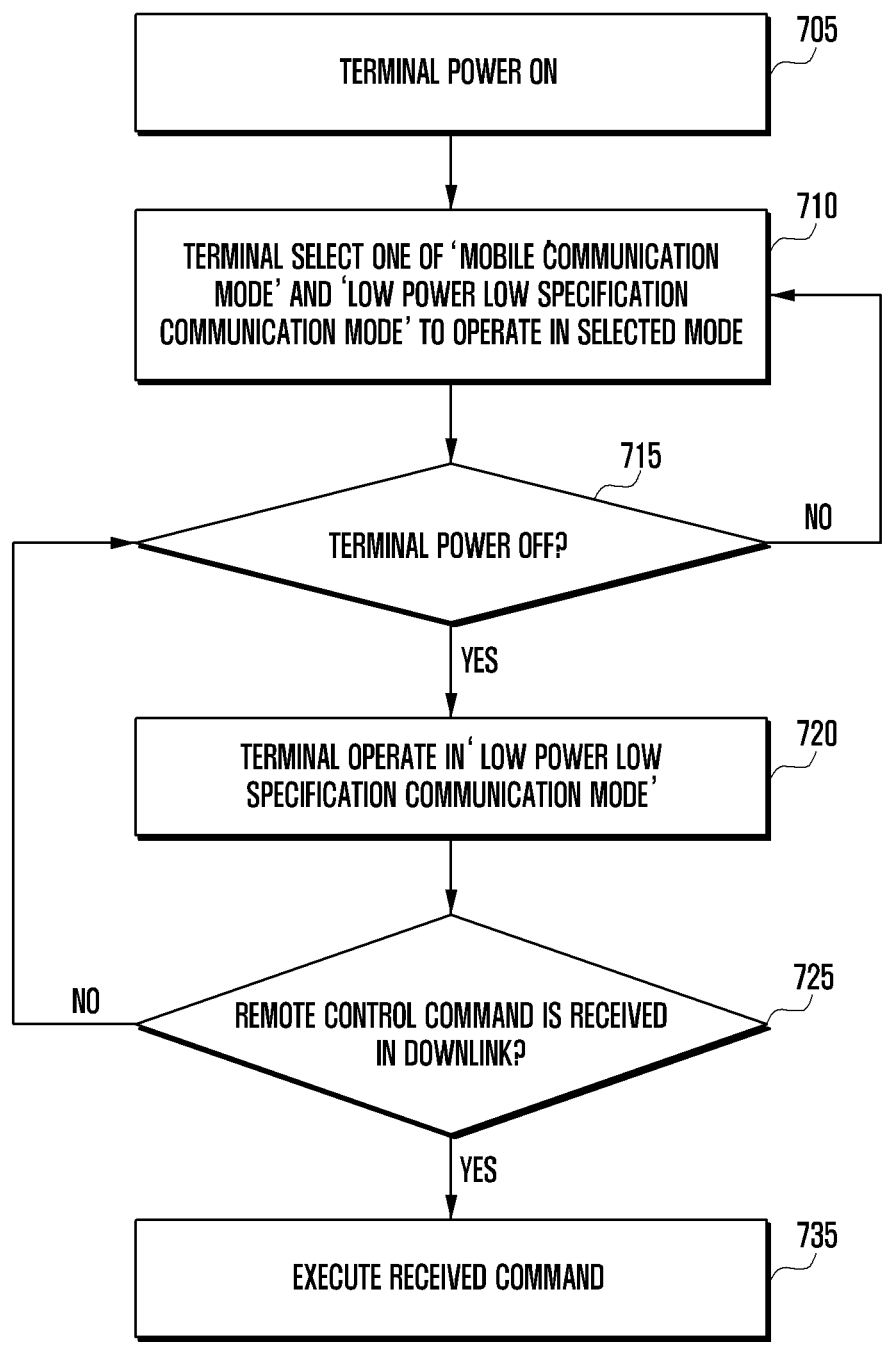
FIG. 7 is a flowchart illustrating a communication mode determination method and a corresponding operation of a terminal according to an embodiment of the present invention.

FIG. 7 is a flowchart illustrating a communication mode determination method and a corresponding operation of a terminal according to an embodiment of the present invention.

In reference to FIG. 7, the terminal may communicate signals with a base station in at least one of a mobile communication mode and a low power low specification communication mode.

At step 705, the terminal may power on to start its operation. It is obvious that the following operation is performed when the terminal attempts to attach to the base station as well as when the terminal powers on. In detail, when the terminal powers on, it may operate in a predetermined mode to communicate signals with the base station using some of its modules. In an embodiment, the mobile communication mode may be interchangeable referred to as HSC mode, and the low power low specification communication mode may be interchangeably referred to as LPC mode.

At step 710, the terminal may select at least one of the mobile communication mode and the low power low specification communication mode to communicate signals with the base station.

At step 715, the terminal determines whether its power is turned off. If the power is not turned off, the procedure goes back to step 710.

If the power is turned off, the terminal may operate in the low power low specification communication mode at step 720. In an embodiment, the terminal in the low power low specification communication mode may supply power to only the blocks associated with the low power low specification communication mode to reduce power consumption. According to an embodiment, in a predetermined mode, even if the power is turned off, the LPC mode-related modules may operate. For example, in the case where the terminal is stolen and thus receives a related message, the terminal may continue operating the LPC mode-related modules even when the power is turned off in response to a user input to report terminal location to the base station and receive data from the base station in the LPC mode.

At step 725, the terminal may determine whether a remote control command-related information is received from the base station via a downlink signal. If no such information is received, the terminal may maintain its power-off state and determine whether the power is turned on.

If remote control command-related information is received via a downlink signal, the terminal may execute the received command at step 735. In detail, the received command may include an instruction for transmitting terminal location information and receiving and transmitting surrounding sensor information. Through this operation, the terminal may transmit specific information to the network according to the control command from the network while consuming the least power in its power-off state. Such an operation makes it possible for the terminal to transmit terminal location information and mobility information to the network in the low power low specification communication mode even when the terminal is lost.

Figure 8:
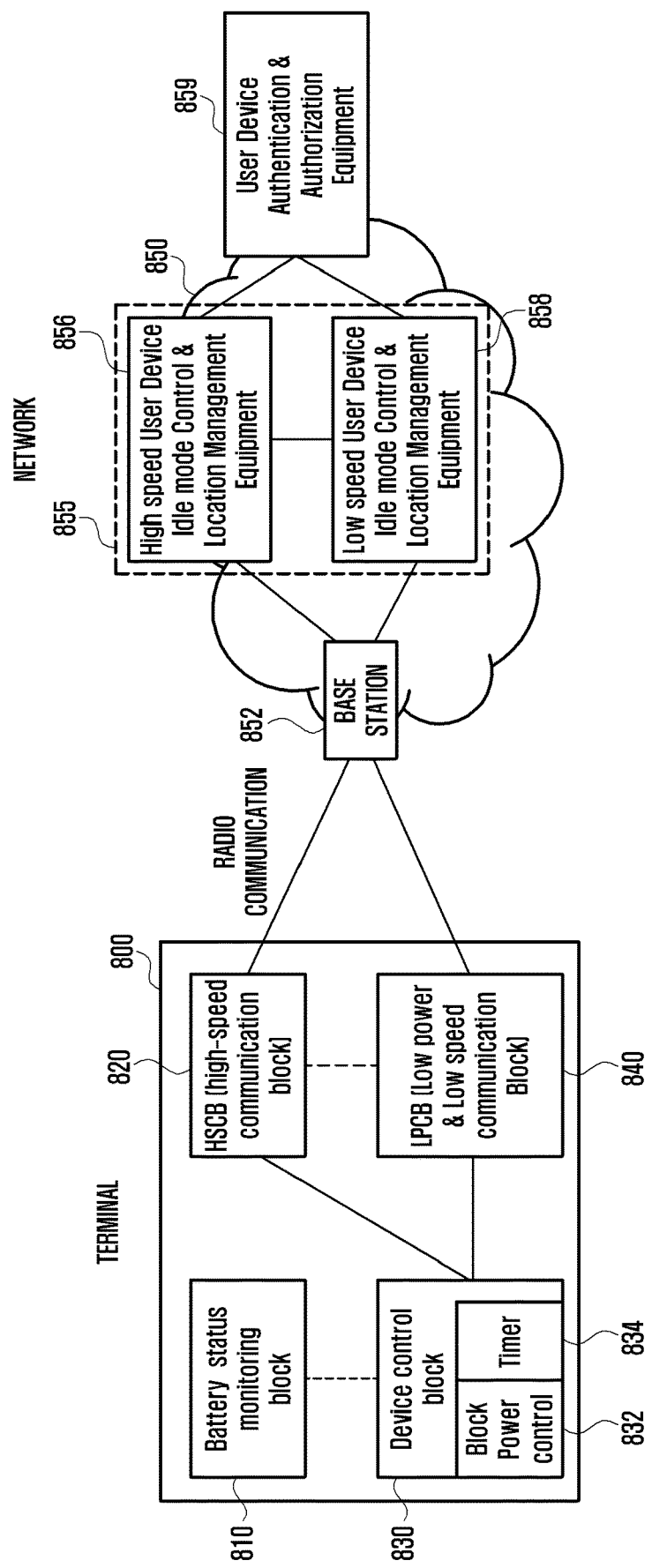
FIG. 8 is a diagram illustrating configurations of a terminal and a network according to another embodiment of the present invention.

FIG. 8 is a diagram illustrating configurations of a terminal and a network according to another embodiment of the present invention.

In reference to FIG. 8, the terminal 800 may include at least one of a battery status monitor 810, an HSCB 820, a controller 830, and an LPCB 840. The controller 830 may include at least one of a block power control unit 832 and a timer 834.

In an embodiment, the HSCB 820 is a device for performing a high-speed communication, and the LPCB 840 may perform communication at a power lower than that of the HSCB 820. The HSCB 820 and the LPCB 840 may share some modules of a processor and perform respective operations under the control of the controller 830. The communication blocks and controller may be implemented via a plurality of processors.

The battery status monitor 810 may monitor the battery status of the terminal. In the case of a mobile terminal, the battery status monitor 810 may monitor the battery for indicating a low residual battery power or a necessity of a long communication. The battery status monitor 810 may also determine the type of application in use and the battery status according to the user settings.

The controller 830 may control overall operations of the terminal (in particular, the block power control unit 832 may control the power required for communication) and determine a communication scheme per operation mode via the timer 834.

The terminal 800 may connect to the radio network 850, which may include a base station 852 and a user device idle mode control and location management equipment 855. The base station 852 may communicate signals with the terminal through a radio network in such a way of relaying the information transmitted by a network node to the terminal 800 and the information transmitted by the terminal 800 to the network node.

In an embodiment, the user device idle mode control and location management equipment 855 may be part of the base station 852 or a separate network node. In an embodiment, the user device idle mode control and location management equipment 855 may include a high speed user device idle mode and location management equipment 856 and a low speed user device idle mode control and location management equipment 858. The high speed user device idle mode and location management equipment 856 and the low speed user device idle mode and location management equipment 858 may be separate nodes or separate logical nodes implemented in one node. In an embodiment, the high speed user device idle mode control and location management equipment 856 may perform an operation for communication with the terminal 800 in the HSC mode, and the low speed user device idle mode control and location management equipment 858 may perform an operation for communication with the terminal in the LPC mode. According to an embodiment, the high speed user device idle mode control and location management equipment 856 may be an MME and the low speed user device idle mode and location management equipment 858 may be an MTC-dedicated MME. Each idle mode control and location management deice may perform a mobility management operation per a communication mode of a terminal, and the low speed user device idle mode control and location management equipment 858 may support functions corresponding to MTC terminal features. In detail, the MTC terminal features may include perform terminal location update at a long interval with the assignment of a separate tracking area update timer value. In an embodiment, when the terminal in the LPC mode connects to a network node, the low speed user device idle mode control and location management equipment 858 may assign a timer value for location information update to the terminal based on the terminal's subscription information or other information provided by the terminal.

In an embodiment, the user device idle mode control and location management equipment 855 may connect to a user device authentication and authorization equipment 859. The user device authentication and authorization equipment 859 may manage a terminal's subscription information. The user device authentication and authorization equipment 859 may also provide the identity information of the terminal connected via the user device idle mode control and location management equipment 855. In detail, if the terminal connects to the network 850 in the HSC and LPC modes with the same terminal identifier, the user device authentication and authorization equipment 859 may provide the user device idle mode control and location management equipment 855 with the user information, and the user device idle mode control and location management equipment 855 may perform terminal mobility management based on the per-mode user information. In an embodiment, the user device authentication authorization device 859 may be a home subscriber server (HSS).

Figure 9:
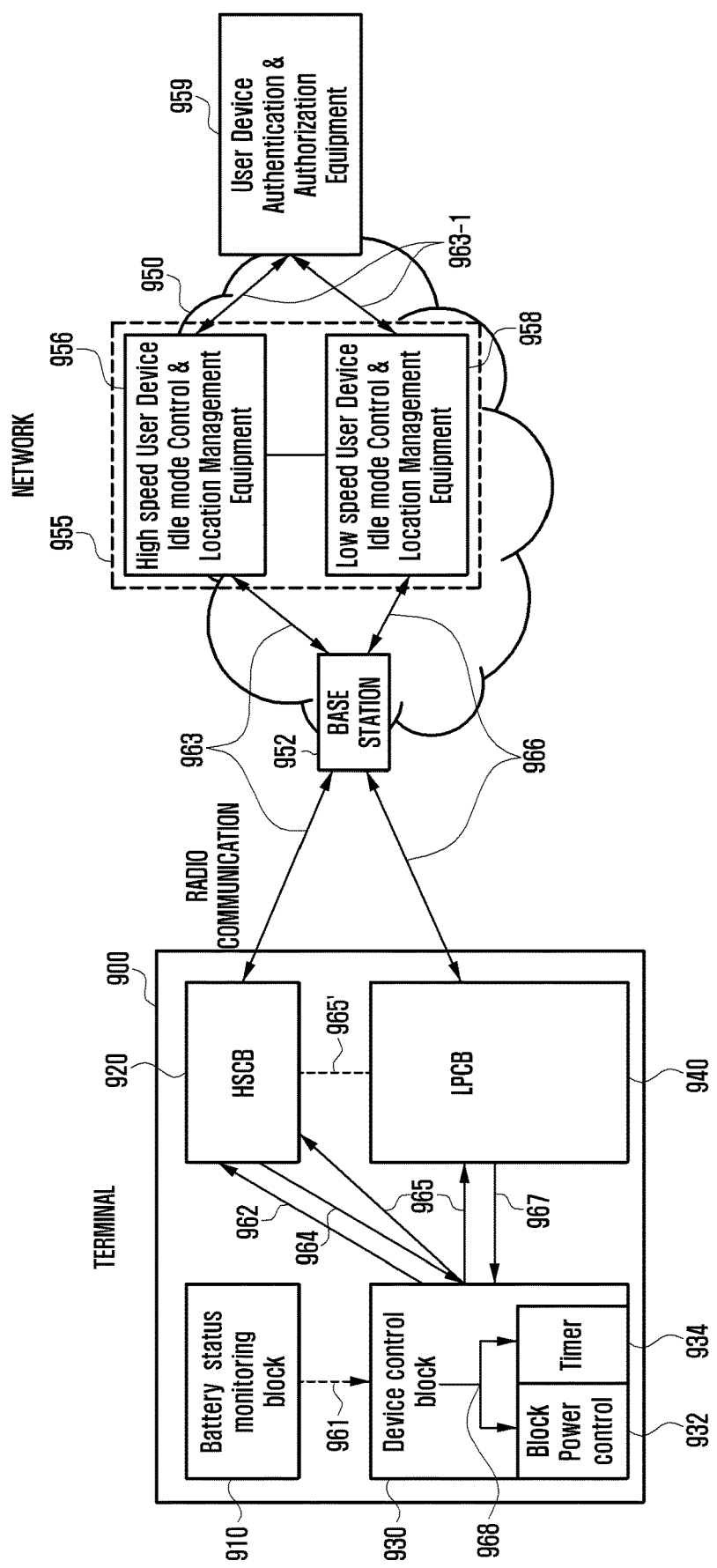
FIG. 9 is a diagram illustrating a mode determination and switching method of a terminal and a method for signal exchange between the terminal and a base station according to another embodiment of the present invention.

FIG. 9 is a diagram illustrating a mode determination and switching method of a terminal and a method for signal exchange between the terminal and a base station according to another embodiment of the present invention.

In the embodiment of FIG. 9, the terminal 900 may include at least one of a battery status monitor 910, an HSCB 920, a controller 930, and an LPCB 940. The controller 930 may include at least one of a block power control unit 932 and a timer 934.

In an embodiment, the HSCB 920 is a device for performing a high speed communication, and the LPCB 940 performs communication at a power lower than that of the HSCB 920. The HSCB 920 and the LPCB 940 may share some modules of a processor and perform respective operations under the control of the controller 930. The communication blocks and controller may be implemented via a plurality of processors.

The battery status monitor 910 may monitor the battery status of the terminal. In the case of a mobile terminal, the battery status monitor 910 may monitor the battery for indicating a low residual battery power or a necessity of a long communication. The battery status monitor 910 may also determine the type of application in use and the battery status according to the user settings.

The controller 930 may control overall operations of the terminal (in particular, the block power control unit 932 may control the power required for communication) and determine a communication scheme per operation mode via the timer 934.

The terminal 900 may connect to the radio network 950, which may include a base station 952 and a user device idle mode control and location management equipment 955. The base station 952 may communicate signals with the terminal through a radio network in such a way of relaying the information transmitted by a network node to the terminal 900 and the information transmitted by the terminal 900 to the network node.

In an embodiment, the user device idle mode control and location management equipment 955 may be part of the base station 952 or a separate network node. In an embodiment, the user device idle mode control and location management equipment 955 may include a high speed user device idle mode and location management equipment 956 and a low speed user device idle mode control and location management equipment 958. The high speed user device idle mode and location management equipment 956 and the low speed user device idle mode and location management equipment 958 may be separate nodes or separate logical nodes implemented in one node.

In an embodiment, the user device idle mode control and location management equipment 955 may connect to a user device authentication and authorization equipment 959. The user device authentication and authorization equipment 959 may manage a terminal's subscription information. The user device authentication and authorization equipment 959 may also provide the identity information of the terminal connected via the user device idle mode control and location management equipment 955. In detail, if the terminal connects to the network 950 in the HSC and LPC modes with the same terminal identifier, the user device authentication and authorization equipment 959 may provide the user device idle mode control and location management equipment 955 with the user information, and the user device idle mode control and location management equipment 955 may perform terminal mobility management based on the per-mode user information. In an embodiment, the user device authentication authorization device 959 may be a home subscriber server (HSS). In an embodiment, the context information that the terminal 900 receives from the base station when it connects to the network 950 in the LPC mode may be determined based on the context information used when the terminal 900 connects to the network 950 in the HSC mode. In detail, the information for use by the network 950 in identifying the terminal in the HSC mode may be identical in part with the information for use by the network 950 in identifying the terminal in the LPC mode, and it may be formed by appending information values corresponding to the HSC mode and LPC mode to the same prefix value corresponding to the terminal 900. The user device authentication and authorization equipment 959 may transmit to the user device idle mode control and location management equipment 955 a message to request for relay of information to the UE 900.

At step 961, the battery status monitor 910 may monitor the battery status of the terminal. If the residual battery power of the terminal 900 is equal to or less than a predetermined level, the battery status monitor 910 may send the controller 930 information indicative of entrance into a minimum power communication mode. If a condition preset by the user is satisfied, the battery status monitor 910 may send the controller 930 the information indicative of minimum power communication mode entrance. In an embodiment, the battery status for entering the minimum power communication mode may be determined by at least one of the network and user settings.

At step 962, if it is determined to enter the minimum power communication mode, the controller 930 may send a signal to the HSCB 920 for communication path switching. In detail, the controller may send the HSCB 920 a signal indicating a communication path switching to the LPCB 940.

At step 963, the HSCB 920 may send the core network 950 the information on the switched communication path. In detail, the HSCB 920 may send the core network the information indicating that the communication path is switched to the LPCB 940 according to the entrance into the minimum power communication mode. The core network node 954 that receives the information may be the base station 952 or the user device idle mode control and location management equipment 955 and, in an embodiment, the information indicative of the communication path switching may be transmitted to the high speed user device idle mode control and location management equipment 956. In detail, the UE 900 is performing an operation of mobility management via the high speed user device idle mode control and location management equipment 956 and may receive a control signal and transmit to the high speed user device idle mode control and location management equipment 956 the information indicating that it attempts to connect to the high speed user device idle mode control and location management equipment 956 via the low speed user device idle mode control and location management equipment 958 for communication path switching. The information being transmitted may include at least one of an indicator for indicating connection switching and identity information associated with the terminal 900. The HSCB 920 may receive a response related to the communication path switching from the core network. The communication path switching-related response may include context information for use in connecting to the network 950 in the LPC mode. Afterward, the terminal 900 may connect to the network via the low speed user device idle mode control and location management equipment 958 based on the context information.

At step 963-1, the high speed user device idle mode control and location management equipment 956 may transmit to the low speed user device idle mode control and location management equipment 958 the information on the terminal 900 of which connection is to be switched. In detail, the high speed user device idle mode control and location management equipment 956 may transmit the information to the low speed user device idle mode control and location management equipment 958 through a direct connection therebetween or via the user device authentication and authorization equipment 959.

In an embodiment, for the case of transmitting the terminal information directly, the high speed user device idle mode control and location management equipment may transmit the context information associated with the terminal to the low speed user device idle mode control and location management equipment 958 and, afterward, the terminal may connect to the network 950 via the user device idle mode control and location management equipment based on the context information.

In another embodiment, for the case of transmitting the UE information via the user device authentication and authorization equipment 959, the high speed user device idle mode control and location management equipment 956 may transmit terminal identity information to the user device authentication and authorization equipment 959 and, afterward, the user device authentication and authorization equipment 959 may transmit the corresponding information in response to a request for terminal subscription information that is transmitted by the low speed user device idle mode control and location management equipment 958. As the network 950 manages the identity information of the UE 900 for use in the HSC and LPC modes in an integral manner as above, when it is necessary for the terminal 900 operating in the LCP mode to connect to the network in the HSC mode, the high speed user device idle mode control and location management equipment 956 may transmit a paging request to the low speed user device idle mode control and location management equipment 958 based on the identity information such that the low speed user device idle mode control and location management equipment 956 transmits a paging signal generated based thereon for instructing the terminal to make a connection in the HSC mode.

At step 964, the HSCB 920 may send communication path switching-related information to the controller 930. In detail, the HSCB 920 may send the controller 930 the information indicating that the communication path switching has been completed.

At step 965, the controller 930 may send the information indicating that the minimum power communication mode is enabled to at least one of the HSCB 920 and the LPCB 940. This information may be selectively transmitted to at least one of the HSCB 920 and the LPCB 940. In the case that the information is selectively transmitted, one of the HSCB 920 and the LPCB 940 may transmit the information to the other. In an embodiment, the minimum power communication mode may include perform the low power low speed communication in the idle state. In detail, the terminal 900 in the idle mode may reduce standby power consumption by switching from HSC to LPC.

At step 966, the LPCB 940 may exchange service start-related information associated with the minimum power communication mode with the core network 950. The nodes for exchanging the information may include at least one of the base station 952 and the low speed user device idle mode control and location management equipment 958. In this case, it may be possible to perform an additional procedure for connection or use part of the information related to the communication being performed via the HSCB 920. In detail, it may be possible to attach to the network for performing LPC based on the terminal context information in use for HSC. The context information may include identity information for use by the network in identifying the terminal. The identifiers for use in connection to the network for LPC and HSC may include the same information. In detail, the identifier for use in LPC may be identical, in whole or in part, with the identifier for use in HSC, or part of the identifier for use in HSC may be identical with the identifier for use in LPC.

At step 967, the LPCB 940 may send the controller 930 the information indicating that a registration with the core network 950 for starting a service has been completed. In detail, the LPCB 940 may send the controller 930 the information indicating that the LPCB 940 has been provided for a service.

At step 968, the controller 930 may perform an operation related to the minimum power communication mode via the block power control unit 932 and the timer 934. In the minimum power communication mode, it may be possible to stop or minimize power supply to the operation blocks with the exception of the least number of operation blocks required for communication. In an embodiment, the operations of the controller may include allocating power to the operation blocks associated with the LPCB 940 preferentially. In detail, the operation related to the minimum power communication mode may include at least one of monitoring for LPC-related messages and transmitting information related to the terminal 900 to the network 950 through LPC.

In an embodiment, operations of some of the steps may be omitted depending on the scenario, e.g., the operations of steps 962 to 964 may be omitted or performed selectively.

Figure 10:
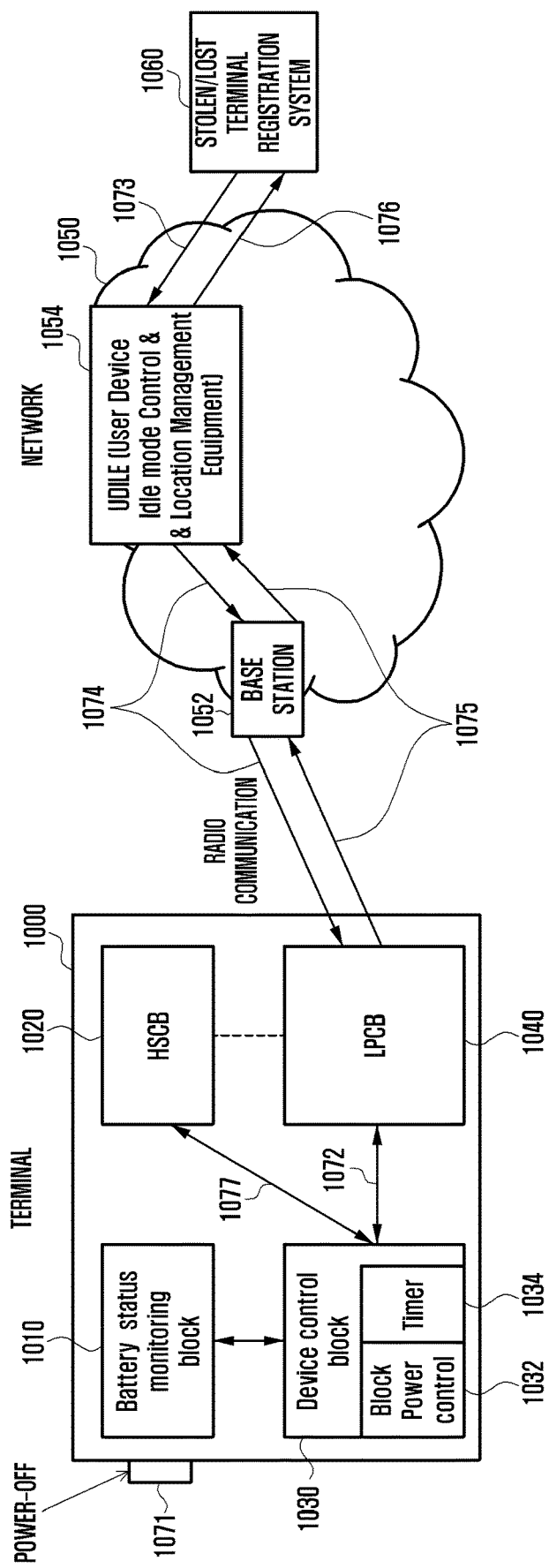
FIG. 10 is a diagram illustrating a method for exchanging signals between a terminal and a network according to another embodiment of the present invention.

FIG. 10 is a diagram illustrating a method for exchanging signals between a terminal and a network according to another embodiment of the present invention.

In reference to FIG. 10, the terminal 1000 may include at least one of a battery status monitor 1010, a high speed communication unit (HSCB) 1020, a controller 1030, and a low power low speed communication unit (LPCB) 1040. The controller 1030 may include at least one of a block power control unit 1032 and a timer 1034.

In an embodiment, the HSCB 1020 is a device for performing a high-speed communication, and the LPCB 1040 may perform communication at a power lower than that of the HSCB 1020. The HSCB 1020 and the LPCB 1040 may share some modules of a processor and perform respective operations under the control of the controller 1030. The communication blocks and controller may be implemented via a plurality of processors.

The battery status monitor 1010 may monitor the battery status of the terminal. In the case of a mobile terminal, the battery status monitor 1010 may monitor the battery for indicating a low residual battery power or a necessity of a long communication. The battery status monitor 1010 may also determine the type of application in use and the battery status according to the user settings.

The controller 1030 may control overall operations of the terminal (in particular, the block power control unit 1032 may control the power required for communication) and determine a communication scheme per operation mode via the timer 1034.

The terminal 1000 may connect to the radio network 1050, which may include a base station 1052 and a user device idle mode control and location management equipment 1054. In an embodiment, it is assumed that the terminal is operating in the LPC mode, and the user device idle mode control and location management equipment 1054 may be a low speed user device idle mode control and location management equipment, but it may also perform operations of a high speed user device idle mode control and location management equipment. The base station 1052 may communicate signals with the terminal through a radio network in such a way of relaying the information transmitted by a network node to the terminal 1000 and the information transmitted by the terminal 1000 to the network node.

In an embodiment, the user device idle mode control and location management equipment 1054 may be an element of the base station 1052 or a separate network node.

In an embodiment, the user device idle mode control and location management equipment 1054 may be connected to a stolen/lost terminal registration system 1060. The stolen/lost terminal registration system 1060 may be implemented as a separate server or included in a node managing subscriber information. In detail, the stolen/lost terminal registration system 1060 may be an element of an HSS and, in this case, it may update at least one of stolen terminal information and lost terminal information in the subscription information in order for the network 1050 to notice that the terminal 100 is in the state of being stolen or lost. In an embodiment, the stolen/lost terminal registration system 1060 may transmit to the user device idle mode control and location management equipment 1054 at least one of the stolen terminal information and lost terminal information via separate signaling, and the user device idle mode control and location management equipment 1054 may transmit to the terminal 1000 a signal for controlling the terminal 1000 based on the received information.

At step 1071, it may occur that the terminal powers off. In detail, the power may be turned off in response to a user input or a monitoring result of the block power control unit 1032. If the power is turned off in response to a user input, this may include the possibility that a person who finds the lost terminal turns off the power.

At step 1072, the controller 1030 may control to continue power supply to the LPCB 1040 to operate. In detail, if it is determined that the terminal 1000 is in the state of being lost, the controller 1030 continues power supply to the LPCB 1040 to maintain communication with the network 1050. In an embodiment, the controller 1030 may control the terminal to operate as above for the case where the terminal is in the state of being lost and receive an indicator instructing for the LPCB 1040 to stay awake even when the power is turned off from the network 1050 before the power-off. Because the LPCB 1040 stays awake even when the terminal 1000 is powered off, the terminal 1000 may transmit terminal location information to the network 1050 and, in a certain case, activate its other function based on a signal received from the network 1050. The activated functions may include outputting an alarm with an output device of the terminal 1000 such as a speaker, a light lamp, and a vibrator. In an embodiment, the controller 1030 may control to perform the above operation even in the case where it is determined that the terminal 1000 is not in the state of being lost.

At step 1073, it may be possible to register the lost terminal information or stolen terminal information with the stolen/lost terminal registration system 1060. In detail, the lost terminal information or stolen terminal information may be registered with the stolen/lost terminal registration system 1060 by the user of the terminal 1000 or the operator of the network 1050. In an embodiment, the stolen/lost terminal registration system 1060 may transmit the lost terminal information to the user device idle mode control and location management equipment 1054. In detail, the user device idle mode control and location management equipment 1054 may transmit a signal for controlling the terminal 1000 based on the lost terminal information.

At step 1074, the user device idle mode control and location management equipment 1054 may transmit a location information report request message to the terminal 1000 based on the received information. The location information report request message may be a message for instructing the terminal 1000 to make a report and include location information request information and location report interval information.

At step 1075, the terminal may transmit its location information to the network 1050 based on the received information. In detail, the terminal 100 may transmit its location information generated based on the received information to the network 1050 at an interval determined based on the received information. In an embodiment, the controller 1030 may activate a location information acquisition module of the terminal 1000 based on the received information. In detail, the UE 1000 may be provided with a GPS module, which acquires accurate location information and transmits the acquired information to the network 1050 under the control of the controller 1030. In an alternative embodiment, the block power control unit 1032 may monitor the battery status of the terminal to adjust the location information reporting interval based on the battery status. In detail, if a residual battery power is equal to or less than a value configured by the network, it may be possible to control the terminal 1000 to transmit the location information at an extended interval. In an alternative embodiment, if the terminal 1000 receives a message at step 1074, the network 1050 may control the operation of the terminal 1000. In detail, the network 1050 may control the power, communication, and output of the terminal 1000. In this case, the network 1050 may transmit a terminal control signal for controlling the terminal 1000. As described above, it is possible to facilitate locating the stolen or lost terminal by transmitting at least one of the stolen terminal information and the lost terminal information to the network.

At step 1076, the user device idle mode control and location management equipment 1054 may transmit the received information to the stolen/lost terminal registration system 1060. The received information may include information related to the location of the terminal 1000.

Figure 11:
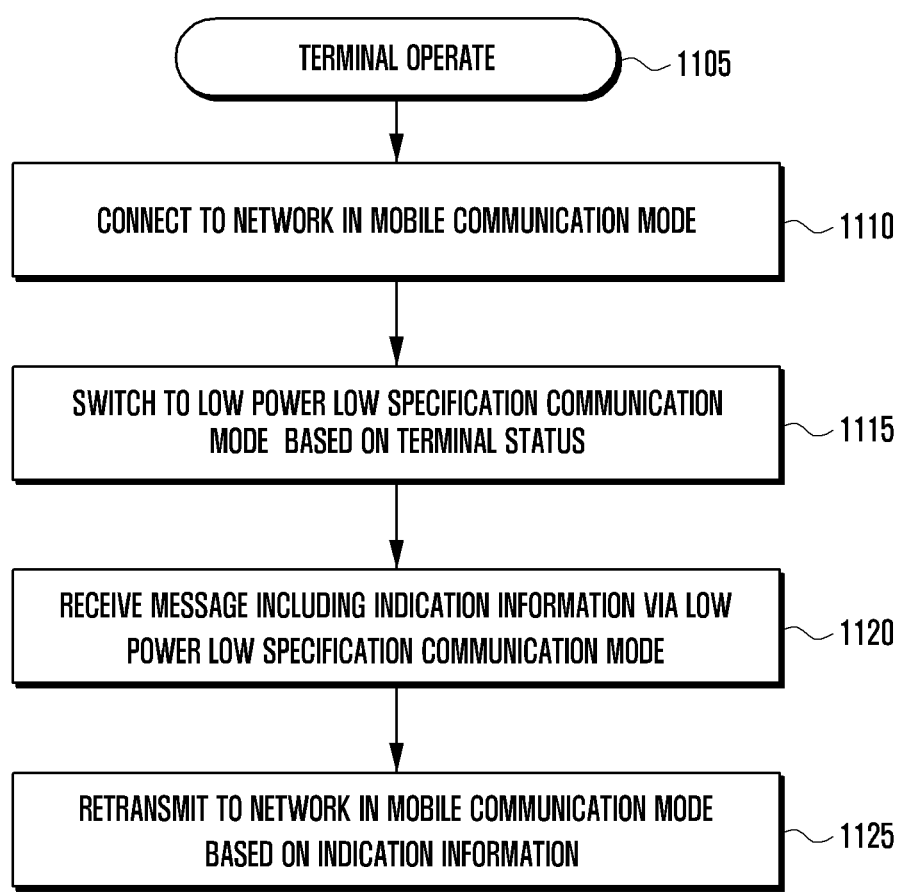
FIG. 11 is flowchart illustrating an operation of a terminal according to an embodiment of the present invention.

FIG. 11 is flowchart illustrating an operation of a terminal according to an embodiment of the present invention.

In reference to FIG. 11, the terminal may transmit and receive signals to and from a network.

At step 1110, the terminal may connect to the network in the HSC mode. In detail, the terminal may transmit an attach request to the network for connection thereto and communicate signals with the network based on the information received from the network.

At step 1115, the terminal may switch to the LPC mode based on the terminal status. In detail, if the residual battery power of the terminal is equal to or less than a predetermined level or if the power of the terminal is turned off, the terminal may connect to the network in the LPC mode. If the terminal switches to the LPC mode, it may transmit a new attach request to the network for establishing an LPC mode connection. According to an embodiment, the terminal may transmit the new attach request to the network using part of the context information used in the HSC mode.

At step 1120, the terminal may receive a message including indication information from the network in the LPC mode. This message may include information indicating that there is information to be transmitted to the terminal via the HSC mode. In detail, the message may be a paging message being transmitted in the LPC mode, and the paging message may include information instructing the terminal to connect to the network in the HSC mode. The paging message may include terminal context information that can be used for HSC mode connection. In detail, the paging message may include terminal identity information for use in connection in the HSC mode.

At step 1125, the terminal may connect to the network in the HSC mode based on the received message. In detail, the terminal may connect to the network based on the message received at step 1120 and receive data necessary for HSC mode connection from the network. In the connection procedure, it may be possible to omit receiving the context information redundantly using the terminal context information.

By configuring the terminal to operate as above, the terminal operates in the LPC mode to reduce standby power consumption and, if necessary, switches from the LPC mode to the HSC mode based on the HSC mode connection instruction message received from the network via the LPC mode connection, thereby facilitating information communication.

Figure 12:
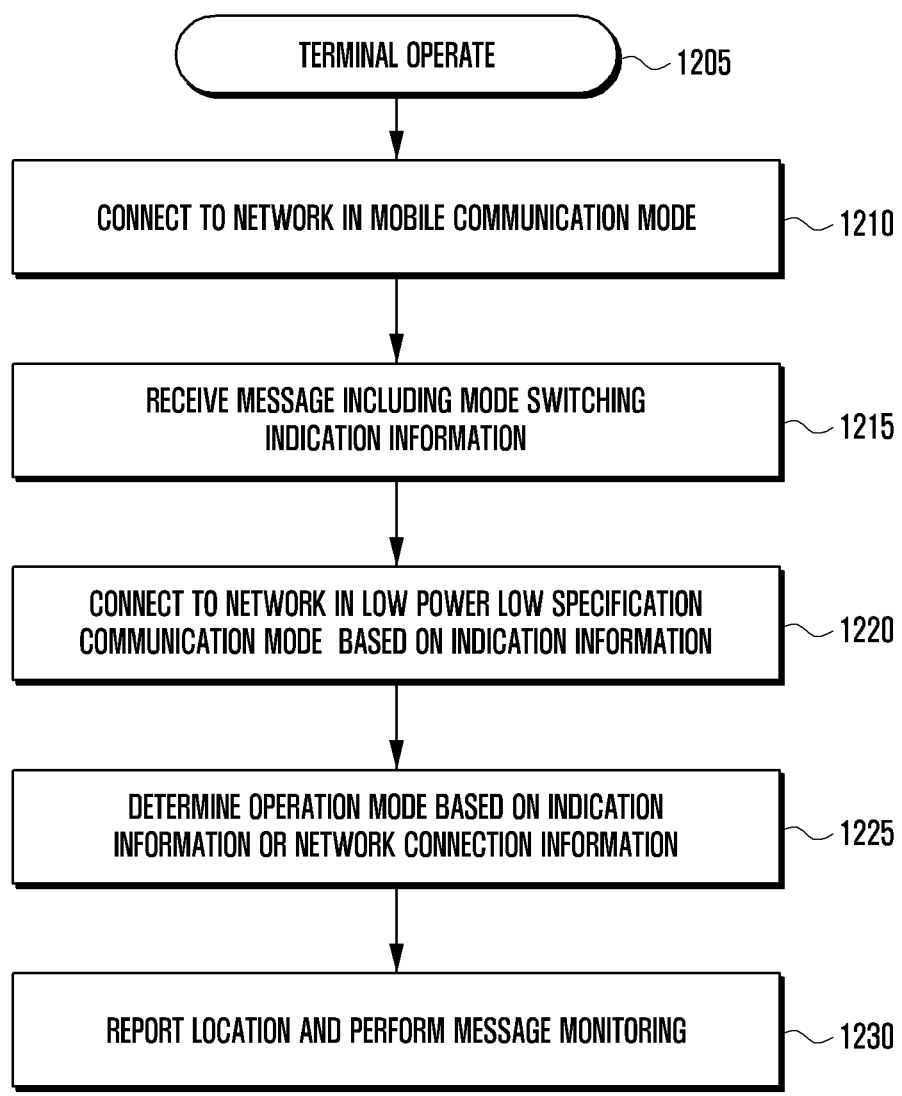
FIG. 12 is a flowchart illustrating an operation of a terminal according to another embodiment of the present invention.

FIG. 12 is a flowchart illustrating an operation of a terminal according to another embodiment of the present invention.

In reference to FIG. 12, the terminal may transmit and receive signals to and from the network.

At step 1210, the terminal may connect to a network in the HSC mode. Although the description is made of the operation of the UE under the assumption that the terminal is connected to the network in the HSC mode according to an embodiment, the present invention is not limited thereto. It is obvious that the terminal may perform the operation proposed in the following description in the state of not being connected to the network on the basis of preconfigured information in the state of being connected to the network in the LPC mode on the basis of the information received from the network.

At step 1215, the terminal may receive a message including mode switching instruction information from the network. In detail, the mode switching instruction information may include information for instructing the terminal to connect to the network in the LPC mode. If the mode switching instruction information is received, the terminal may connect to the network in the LPC mode even when its power is turned off by a user.

At step 1220, the terminal may connect to the network in the LPC mode based on the instruction information. In detail, the terminal may connect to the network in the LPC mode and monitor for messages from the network.

At step 1225, the terminal may determine an operation in the LPC mode based on the information received form the network and previously used connection information. In detail, the terminal may determine the operation to perform based on the terminal location information report interval and accuracy of the location information to be reported.

At step 1230, the terminal may report its location and monitor for messages from the network in the LPC mode. The terminal may perform an operation such as connection in the HSC mode, terminal power control, and additional message transmission based on the information included in the received message.

Figure 13:
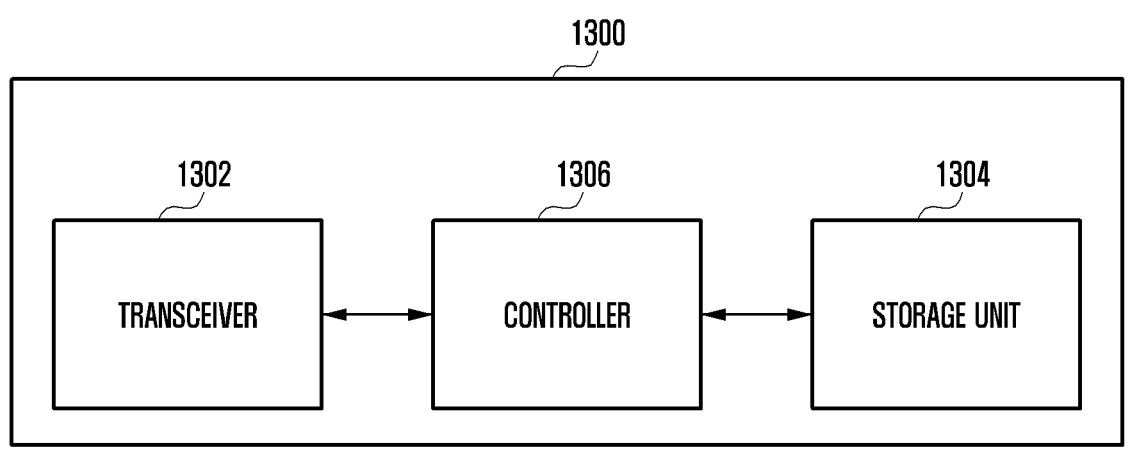
FIG. 13 is a block diagram illustrating a configuration of a terminal according to an embodiment of the present invention.

FIG. 13 is a block diagram illustrating a configuration of a terminal according to an embodiment of the present invention.

In the embodiment of FIG. 13, the terminal 1300 includes a transceiver 1302, a storage unit 1304, and a controller 1306.

The transceiver may transmit and receive signals to and from a base station.

The storage unit 1304 may store at least one of information on the terminal 1300 and information being transmitted and received via the transceiver 1302.

The controller 1306 may control the overall operations of the terminal 1300 to accomplish the above-described embodiments. The controller 1306 may include at least one processor.

Figure 14:
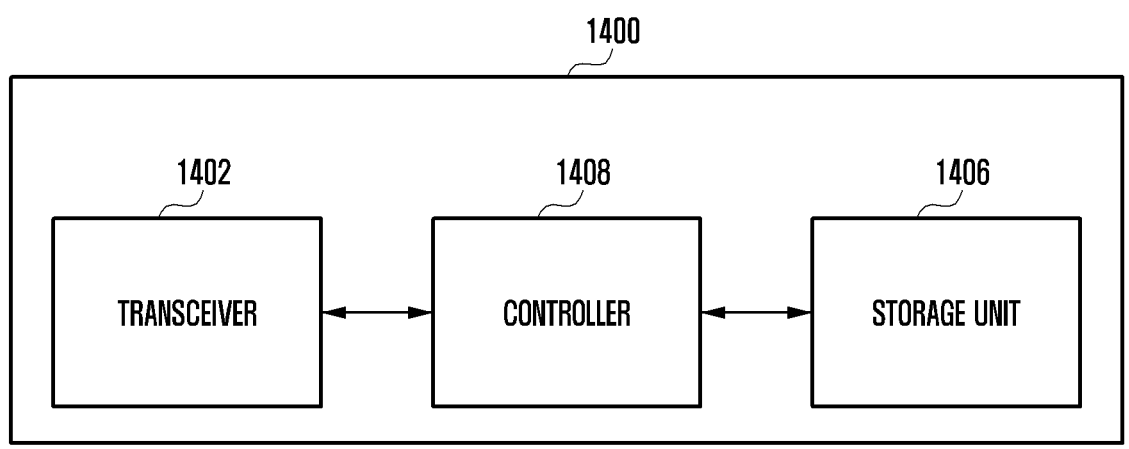
FIG. 14 is a block diagram illustrating a configuration of a base station according to an embodiment of the present invention.

FIG. 14 is a block diagram illustrating a configuration of a base station according to an embodiment of the present invention.

In the embodiment of FIG. 14, the base station 1400 includes a transceiver 1402, a storage unit 1404, and a controller 1406.

The transceiver 1402 may transmit and receive signals to and from a terminal and other network entities.

The storage unit 1404 may store at least one of the information on the base station 1400 and information being transmitted and received via the transceiver 1402.

The controller 1406 may control the overall operations of the base station 1400 to accomplish the above-described embodiments. The controller may include at least one processor.

Figure 15:
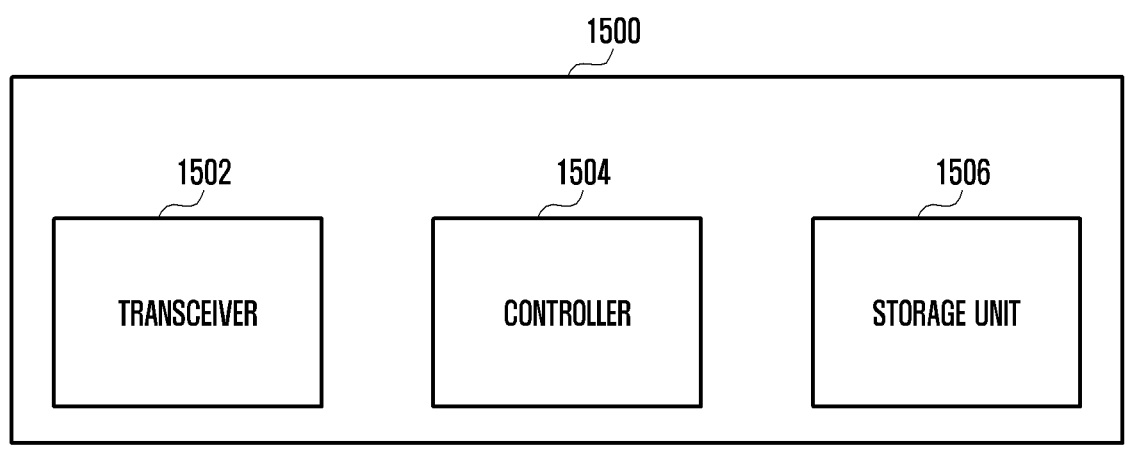
FIG. 15 is a block diagram illustrating a configuration of a network node according to an embodiment of the present invention.

FIG. 15 is a block diagram illustrating a configuration of a network node according to an embodiment of the present invention.

In the embodiment of FIG. 15, the network node may be at least one of a user device idle mode control and location management equipment, a high speed user device idle mode control and location management equipment, a low speed user device idle mode control and location management equipment, and a stolen/lost terminal registration system; the network node 1500 may include a transceiver 1502, a storage unit 1504, and a controller 1506.

The transceiver 1502 may transmit and receive signals to and from a terminal and other network entities.

The storage unit 1504 may store at least one of the information on the network node 1500 and information being transmitted and received via the transceiver 1502.

The controller 1506 may control the overall operations of the network node 1500 to accomplish the above-described embodiments. The controller 1506 may include at least one processor.

Figure 16:
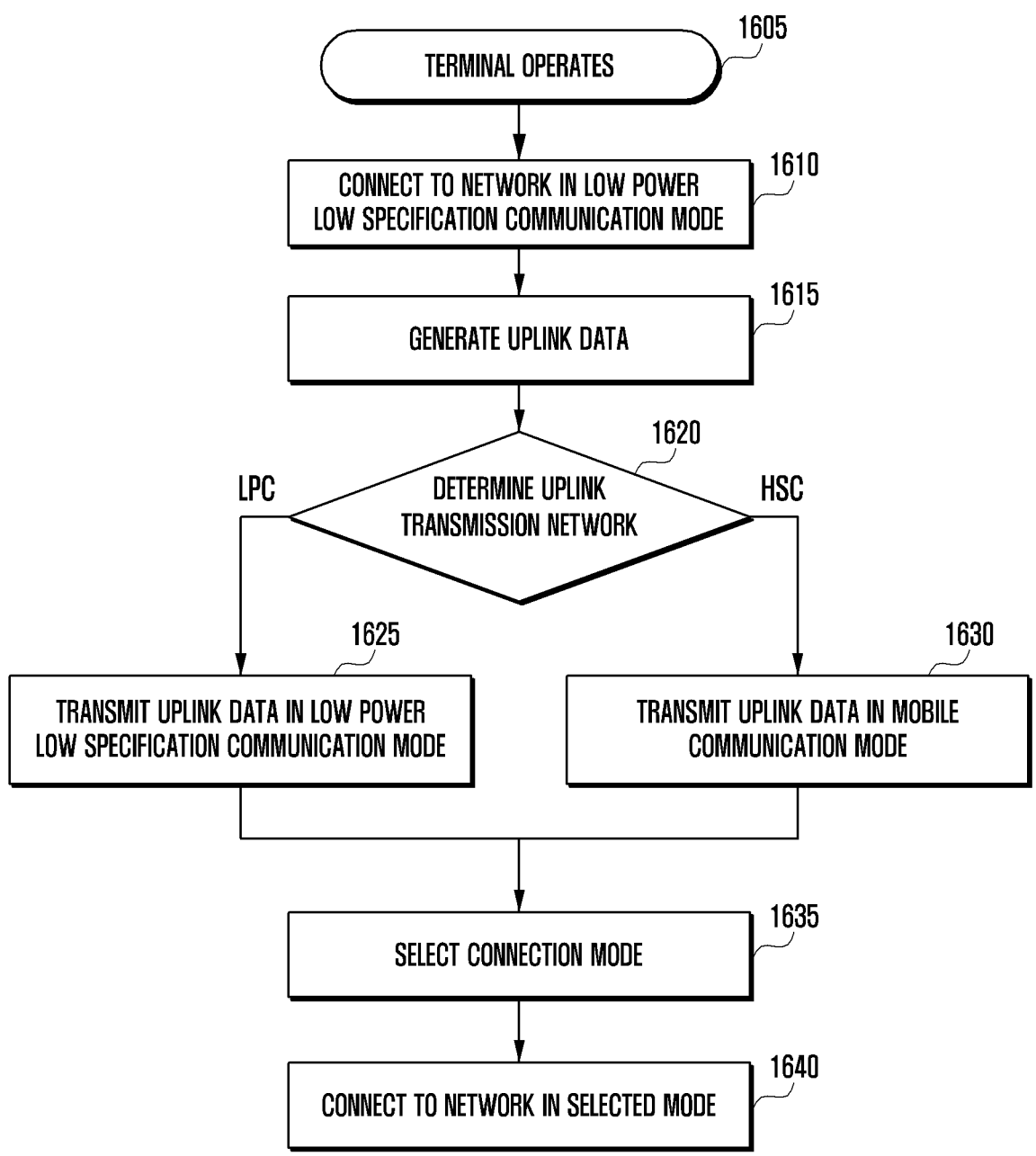
FIG. 16 is a flowchart illustrating an operation of a terminal according to another embodiment of the present invention.

FIG. 16 is a flowchart illustrating an operation of a terminal according to another embodiment of the present invention.

In reference to FIG. 16, the terminal may transmit to and receive from a network. At step 1605, the terminal starts its operation.

At step 1610, the terminal may connect to the network in the LPC mode. In the state of being connected to the network, the terminal may stay in one of a connected mode available for data communication and an idle mode or standby state. In detail, the terminal in the LPC mode may stay on standby in the idle mode.

At step 1615, uplink data to be transmitted may be generated at the terminal. The uplink data may include at least one of data to be transmitted in response to a user request and status information to be reported to the base station. In detail, the data to be reported to the base station may include at least one of channel status information and monitoring information of the terminal.

At step 1620, the terminal may determine a network for transmitting the uplink data. In detail, the terminal may determine a network for transmitting the uplink data based on at least one of a size of the data to be transmitted, importance of the transmission, and a time factor. In an embodiment, if the amount of the data to be transmitted is large, if the importance of the transmission is high, or if the data transmission requires low latency, the terminal may transmit the uplink data to the network in the HSC mode. If all or some of the above conditions are satisfied, the terminal may transmit the uplink data to the network in the LPC mode. If any of the data to be transmitted requires a channel information report in association with the HSC mode cell, the terminal may transmit the uplink data to the network in the HSC mode. In detail, if the size of the generated uplink data is greater than a predetermined size or a value set by the network, the terminal may transmit the uplink data in the HSC. Similarly, the terminal may determine the importance of the data and delay tolerability.

If it is determined at step 1620 that the uplink data has to be transmitted in the LPC mode, the terminal may transmit the uplink data in the LPC mode at step 1625. In detail, the terminal may switch from the idle mode to the connected mode for uplink data transmission in the LPC mode.

If it is determined at step 1620 that the uplink data has to be transmitted in the HSC mode, the terminal may transmit the uplink data in the HSC mode at step 1630. In detail, the terminal may perform an attach procedure for connection to the network in the HSC mode and transmit the generated uplink data in the HSC mode.

At step 1635, the terminal may select a network connection mode after transmitting the uplink data. In detail, if the residual battery power level is low, the terminal may select the LPC mode again. If an acknowledgment corresponding to the data transmitted in the HSC mode is expected, the terminal may select the HSC mode. According to an embodiment, the terminal may select both the two modes.

At step 1640, the terminal may connect to the network in the communication mode selected at step 1635. According to an embodiment, if the terminal selects both the two modes, it may maintain the connection in both the two modes while a timer is running and, if the timer expires, maintains only the LPC mode connection with the network.

Figure 17:
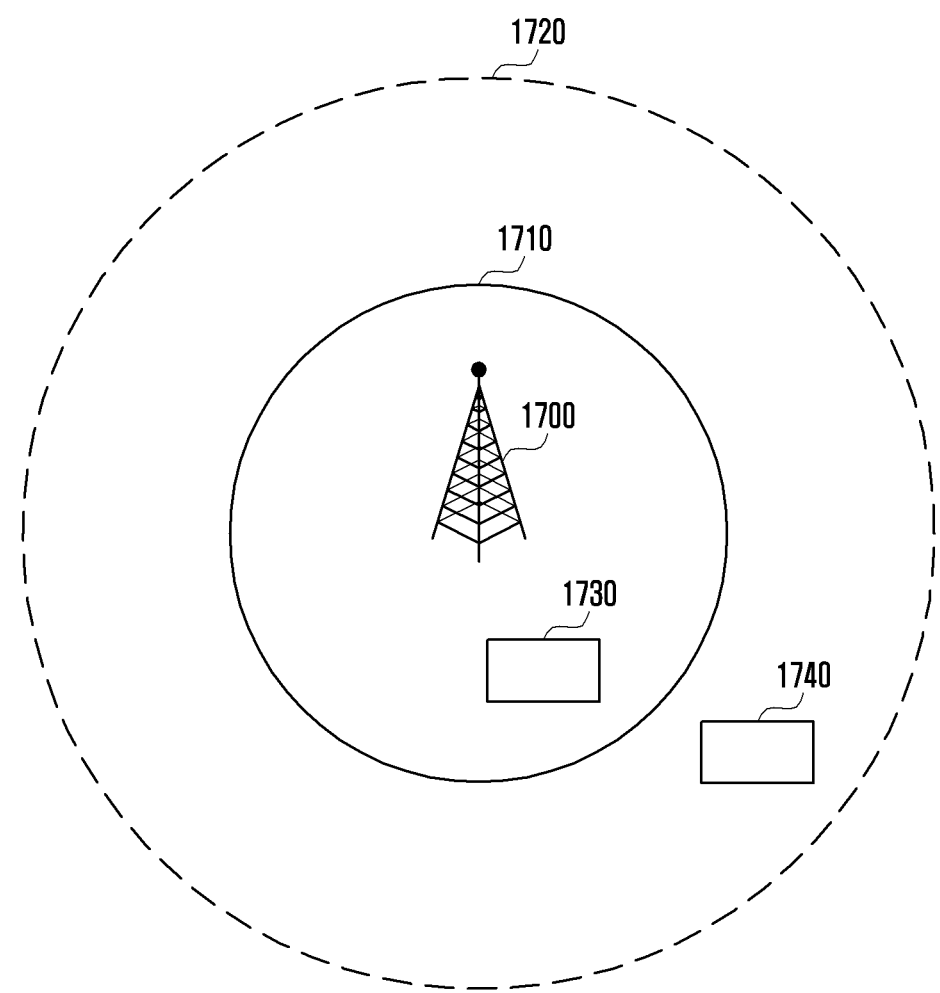
FIG. 17 is a diagram illustrating a communication method of a terminal based on per-cell coverages according to an embodiment of the present invention.

FIG. 17 is a diagram illustrating a communication method of a terminal based on per-cell coverages according to an embodiment of the present invention.

In the embodiment of FIG. 17, the base station 1700 may host a first cell 1701 corresponding to a first communication mode and a second cell 1720 corresponding to a second communication mode. According to an embodiment, the first cell 1710 and the second cell 1720 may be managed by the same base station or different base stations. In an embodiment, the first cell 1710 is a cell for HSC, and the second cell 1720 is a cell for LPC.

In an embodiment, a first terminal 1730 and a second terminal 1740 may transmit and receive signals in at least one cell. In an embodiment, the first terminal 1730 may be located within both the coverages of the first and second cells 1710 and 1720 and select at least one of the first and second cells 1710 and 1720 to transmit and receive signals in the selected cell. In detail, the first terminal 1730 may select the first cell 1710 preferentially to transmit and receive signals and, if at least one of the above-described conditions is satisfied, transmit a signal in the second cell 1720.

The second terminal 1740 may be located out of the coverage of the first cell 1720 and within the coverage of the second cell 1720. In this case, the second terminal 1740 may transmit and receive signals in the second cell 1720 and perform an operation corresponding to the case of being located out of the coverage of the first cell 1710 and in the coverage of the second cell 1720.

Figure 18:
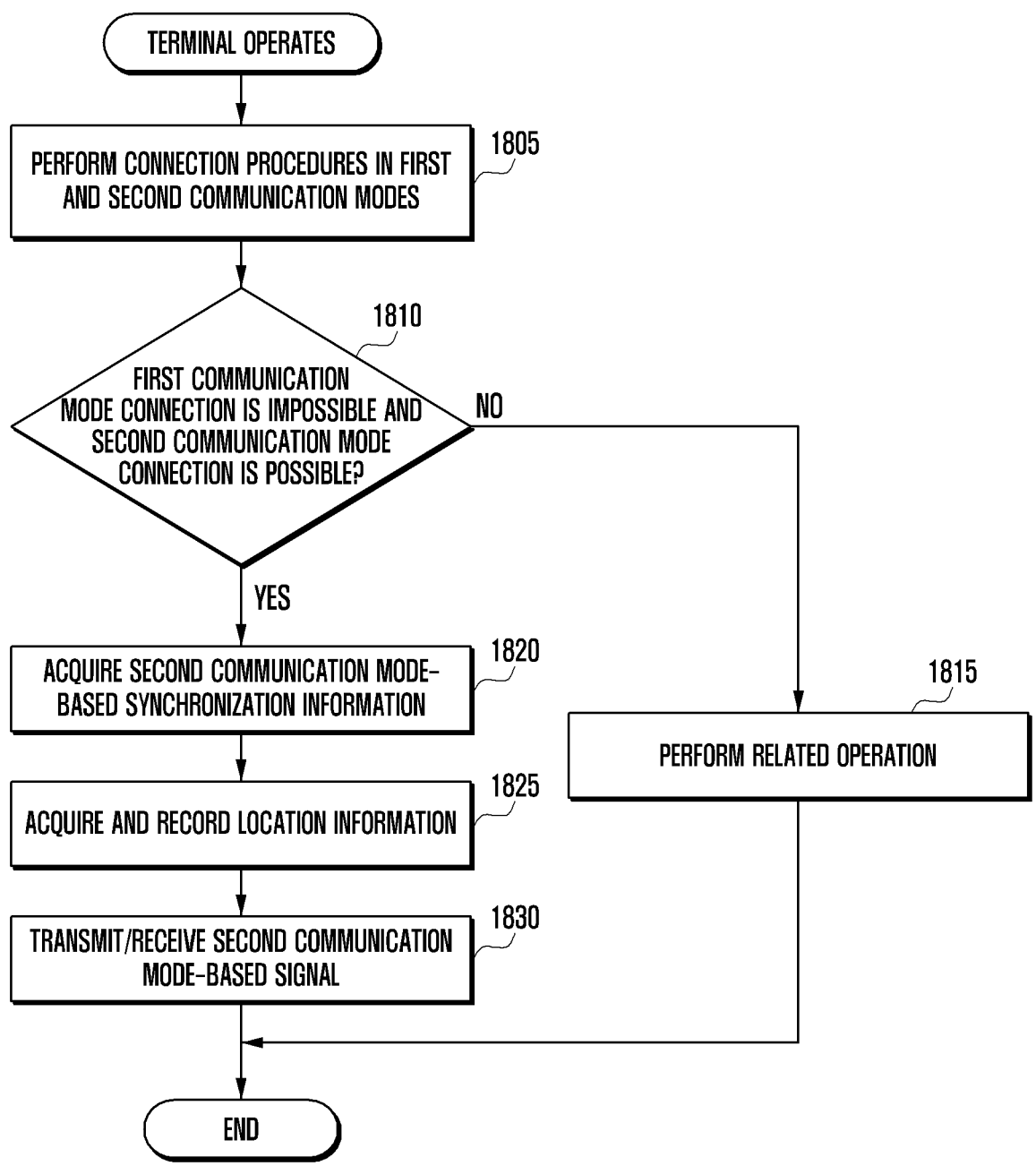
FIG. 18 is a flowchart illustrating an operation of a UE within cell coverages per communication mode according to an embodiment of the present invention.

FIG. 18 is a flowchart illustrating an operation of a UE within cell coverages per communication mode according to an embodiment of the present invention.

At step 1805, the terminal may acquire information on the cells corresponding to the first and second communication modes and perform per-cell connection procedures. According to an embodiment, the terminal may perform a procedure for connecting to at least one cell or only acquire cell information with no connection procedure. The terminal may determine whether it is possible to connect to the cells corresponding to the first and second communication modes. In an embodiment, examples of not being possible to connect to a cell may include a situation where the terminal is out of the coverage of the corresponding cell. In an embodiment, the first communication mode may include the HSC mode, and the second communication mode may include the LPC mode.

At step 1810, the terminal may determine whether it is impossible to connect to the cell corresponding to the first communication mode and possible to connect to the cell corresponding to the second communication mode.

If this is not the case, the terminal may perform a corresponding operation at step 1815. In an embodiment the corresponding operation may include an operation related to the cell to which the connection is impossible and an operation related to the cell to which the connection is possible.

If it is impossible to connect to the cell corresponding to the first communication mode and possible to connect to the cell corresponding to the second communication mode, the terminal may acquire synchronization with the cell corresponding to the second communication mode at step 1820. In an embodiment, the terminal may perform a device to device (D2D) communication corresponding to the first or second communication mode based on the acquired synchronization mode. In detail, the terminal may transmit or receive discovery information of the D2D communication based on the acquired synchronization information.

At step 1825, the terminal may acquire and record location information. In detail, if it is impossible to connect to the cell corresponding to the first communication mode and possible to connect to the cell corresponding to the second communication mode, the terminal may record the corresponding location to acquire accurate cell coverage information. In an embodiment, the information being recorded may include information for use in minimization of drive tests (MDT) in addition to the location information. In detail, the information being recorded may include the cause of impossibility of connection to the cell corresponding to the first communication mode. The terminal may also transmit the acquired information to the base station.

At step 1830, the terminal may transmit and receive signals in the cell corresponding to the second communication mode. In an embodiment, transmitting and receiving signals in the cell corresponding to the second communication mode may include providing the terminal with a predetermined service in the second communication mode. In detail, the predetermined service may include a service available in the second communication mode and a service corresponding to the bandwidth of the second communication mode. In an embodiment, such services may include a VoLTE service and an information exchange service via a narrowband communication.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A communication method of a terminal in a mobile communication system, the method comprising:
    receiving first information on a first communication mode;
    receiving second information on a second communication mode;
    determining to perform a communication with a base station based on the second communication mode in case that a predetermined condition is satisfied;

transmitting, to the base station, a first message including a terminal identity for communicating based on the second communication mode with context information of the terminal used for the first communication mode, according to the determination to perform the communication with the base station based on the second communication mode, the terminal identity being associated with the first communication mode;
transmitting or receiving a signal with the base station based on the second communication mode using the terminal identity associated with the first communication mode; and
receiving a paging signal for communicating with the base station based on the second communication mode,
wherein the terminal identity associated with the first communication mode is used for receiving the paging signal.

2. The method of claim 1, further comprising:
monitoring a status of the terminal; and
transmitting a first request message for requesting to connect with the base station using the first communication mode based on a result of the monitoring,
wherein the status of the terminal comprises a battery status of the terminal.

3. The method of claim 1, further comprising transmitting, in case that the terminal cannot communicate signals with the base station based on the first communication mode, a second request message for requesting to connect to the base station using the second communication mode.

4. The method of claim 1, further comprising:
receiving a power-off command;
performing an operation associated with the second communication mode in response to the power-off command; and
controlling, in case that a second message is received based on the second communication mode, the terminal based on the second message.

5. The method of claim 4, wherein the performing of the operation associated with the second communication mode comprises transmitting location information of the terminal based on the second communication mode.

6. The method of claim 1, further comprising:
acquiring, in case that the terminal is located out of coverage of a cell for the first communication mode and in coverage of a cell for the second communication mode, location information corresponding thereto; and
transmitting the acquired location information to the base station.

7. The method of claim 1, further comprising:
acquiring synchronization information corresponding to the second communication mode; and
transmitting or receiving a signal based on the first communication mode based on the acquired synchronization information.

8. The method of claim 1, further comprising:
receiving, from the base station, a third message based on the second communication mode, the third message indicating for communicating based on the first communication mode; and
transmitting, to the base station, a forth message for requesting a communication based on the first communication mode based on the third message.

9. A terminal of a mobile communication system, the terminal comprising:
a transceiver configured to transmit and receive signals; and
at least one processor connected to the transceiver and configured to:
control to receive first information on a first communication mode,
receive second information on a second communication mode,
determine to perform a communication with a base station based on the second communication mode in case that a predetermined condition is satisfied,
transmit, to the base station via the transceiver, a first message including a terminal identity for communicating based on the second communication mode with context information of the terminal used for the first communication mode, according to the determination to perform the communication with the base station based on the second communication mode, the terminal identity being associated with the first communication mode,
transmit or receive a signal with the base station via the transceiver based on the second communication mode using the terminal identity associated with the first communication mode, and
receive, via the transceiver, a paging signal for communicating with the base station based on the second communication mode,
wherein the terminal identity associated with the first communication mode is used for receiving the paging signal.

10. The terminal of claim 9,
wherein the at least one processor is further configured to control to:
monitor a status of the terminal, and
transmit a first request message for requesting to connect with the base station using the first communication mode based on a result of the monitoring, and
wherein the status of the terminal comprises a battery status of the terminal.

11. The terminal of claim 9, wherein the at least one processor is further configured to control to transmit, in case that the terminal cannot communicate signals with the base station based on the first communication mode, a second request message for requesting to connect to the base station using the second communication mode.

12. The terminal of claim 9, wherein the at least one processor is further configured to:
control to receive a power-off command,
perform an operation associated with the second communication mode in response to the power-off command, and
control, in case that a second message is received based on the second communication mode, the terminal based on the second message.

13. The terminal of claim 12, wherein the at least one processor is further configured to control to transmit location information of the terminal based on the second communication mode.

14. The terminal of claim 9, wherein the at least one processor is further configured to control to:
acquire, in case that the terminal is located out of coverage of a cell for the first communication mode and in coverage of a cell for the second communication mode, location information corresponding thereto, and
transmit the acquired location information to the base station.

15. The terminal of claim 9, wherein the at least one processor is further configured to control to:

acquire synchronization information corresponding to the second communication mode, and transmit or receive a signal based on the first communication mode based on the acquired synchronization information.

16. The terminal of claim 9 wherein the at least one processor is further configured to control to:

receive, from the base station via the transceiver, a third message based on the second communication mode, the third message indicating for communicating based on the first communication mode, and transmit, to the base station via the transceiver, a forth message for requesting a communication based on the first communication mode based on the third message.

\* \* \* \* \*